United States Patent [19]
Buckley et al.

[11] Patent Number: 6,064,759
[45] Date of Patent: May 16, 2000

[54] COMPUTER AIDED INSPECTION MACHINE

[76] Inventors: B. Shawn Buckley, 7067 Via Blanca, San Jose, Calif. 95139; Jihong Chen, N.C. Institute, Huazhong University of Science and Technology, Wuhan, Hubei, China, 430074; Dao Shan Yang; Hui Cheng Zhou, both of N.C. Institute, Huazhong University of Science and Technology, Wuhan, Hubei, China, 430074

[21] Appl. No.: 08/965,542

[22] Filed: Nov. 6, 1997

Related U.S. Application Data

[60] Provisional application No. 60/030,771, Nov. 8, 1996.

[51] Int. Cl.[7] .............................. G06K 9/00; G01B 11/24
[52] U.S. Cl. ........................ 382/154; 356/376; 348/125; 382/141
[58] Field of Search .................................. 382/106, 141, 382/154, 199, 203, 285, 286, 149, 151, 108; 356/376; 345/419, 425; 348/86–87, 94–95, 125–130; 250/559.22, 559.23

[56] References Cited

U.S. PATENT DOCUMENTS

| | | |
|---|---|---|
| 4,842,411 | 6/1989 | Wood ...................................... 356/376 |
| 5,347,363 | 9/1994 | Yamanaka ................................ 356/376 |
| 5,642,293 | 6/1997 | Manthey et al. ......................... 382/141 |
| 5,654,800 | 8/1997 | Svetkoff ................................... 356/376 |
| 5,862,552 | 1/1999 | Yamomoto et al. ..................... 382/154 |
| 5,867,592 | 2/1999 | Sasada et al. ............................ 382/154 |

*Primary Examiner*—Leo H. Boudreau
*Assistant Examiner*—Bhavesh Mehta
*Attorney, Agent, or Firm*—Michael J. Persson; William B. Ritchie

[57] ABSTRACT

An automatic inspection method and apparatus using structured light and machine vision cameras to inspect an object in conjunction with the geometric model of the object is disclosed. Camera images of the object are analyzed by computer to produce the location of points on the object's surfaces in three dimensions. During a setup phase before object inspection, the points are analyzed with respect to the geometric model computer file of the object. Many points are eliminated to reduce data-taking and analysis time to a minimum and to prevent extraneous reflections from producing errors. When similar objects are subsequently inspected, points from each surface of interest are spatially averaged to give high accuracy measurements of object dimensions. The inspection device uses several multiplexed sensors, each composed of a camera and a structured light source, to measure all sides of the object on a single pass. Calibration and compensation methods are also disclosed.

52 Claims, 8 Drawing Sheets

COMPUTER AIDED INSPECTION MACHINE

This application claims the benefit of U.S. Provisional application Ser. No. 60/030,771 filed Nov. 8, 1996.

BACKGROUND OF THE INVENTION

1. Field of the Invention

The present invention relates to systems that include mechanisms and computer software operable to extract dimensions from parts based upon the shape of the parts' surfaces and edges. The hardware of the preferred embodiment is SLMV (Structured Light Machine Vision). It combines a structured light (SL) source with a machine vision (MV) camera to locate the part's surfaces in three dimensions. Structured light sources are those which have structure or variations in the light intensity. Moire fringe fields which project dark and bright lines of light on a part are structured light sources. Lines of laser light produced by either rapidly moving a laser spot source or by focusing a laser spot into a line are also structured light sources. Machine vision digitizes the light intensity of the light reflecting from the part being inspected. When the axis of the light source is angled relative to the camera's axis, the location of points on the part's surface can be found by triangulation.

The system combines SLMV hardware with a computer software simulation of the part, the structured light and the camera's view. The simulation uses a geometric model software file that can graphically render the part onto a computer screen. The present invention uses the geometric model simulation to both reduce the time required to make inspections and to improve the accuracy and ease of setup of the inspection.

2. Description of the Related Art

Inspection machines that can inspect a general part fall into two categories: coordinate measuring machines (CMM) and machine vision (MV). CMMs use a computer driven probe that touches or is moved close to the part to get its dimensions. They have the resolution required to inspect today's parts, but are very slow because the probe must be physically moved from point to point around the part. On the other hand, MV uses a solid state camera to quickly get dimensions from a distance by analyzing the part's image with a computer. Machine vision does inspection quickly, but does not have the resolution required for today's quality standards such as ISO 9000. The invention disclosed here has both the resolution of a CMM and the speed of MV.

Geometric model software is commonly used to simulate parts and part-making processes on computers. Computer Aided Design (CAD) uses the geometric model to simulate the part and its design and manipulate the part's perspective. Computer Aided Engineering (CAE) uses the geometric model to simulate the stresses, flows, currents and temperatures around or within the part. Computer Aided Manufacturing (CAM) uses the geometric model to simulate the cutting, forming or assembly of the part. In summary, using geometric model software, the simulated part can be designed, analyzed and manufactured without ever leaving the computer terminal.

The present invention adds Computer Aided Inspection (CAI) to the list of engineering processes that can be set up using a geometric model computer file. Most of today's advanced CMMs and MV systems also use geometric model computer files to set up the inspection of the part. In a CMM, the geometric model is used to direct the probe to various surfaces of the part. In MV, the geometric model is used to find silhouettes of the part to aid inspection. The present invention uses the geometric model for a different purpose: to optimize the inspection process in order to increase the speed and improve the accuracy of the inspection.

Structured light and machine vision combine to form the sensors of the preferred embodiment of the present invention. This combination has been used to determine the location of a surface for several decades. It is used to "scan in" the shape of a 3D object in the art world, the medical world and in manufacturing. Two of the most common structured light sources are Moire fringe fields and laser light lines.

Moire structured light sources project alternating bright and dark intervals much like Venetian blinds do to sunlight. The lines result from precisely controlled diffraction gratings; changing the angle between the gratings changes the spacing of the lines which are projected. Moire structured lighting has been developed over the last decade by several companies; these companies offer inexpensive machine vision cameras combined with Moire light sources for reverse engineering and first-article inspection.

In the MV camera, an edge detection or maximum gradient algorithm very accurately finds where a Moire line crosses the part. By triangulation, the line location establishes the camera-based position of the surface by knowing its pixel row and column location. These are converted to the part reference frame or to a global reference frame by coordinate transformation of the camera data. Other structured light sources use similar algorithms. For example, when a laser line illuminates the part, a centroid algorithm can often be used to find the location of the laser line in the camera's pixel plane. When the laser line illuminates the part, the camera's pixels (light sensing elements) that image the line brighten. The location of the centroid of these bright pixels can be located by algorithms to an accuracy that is typically better than the pixel spacing.

Another form of machine vision uses photogrammetry: two or more MV cameras imaging the same part from different angles. By identifying corresponding features of the part (e.g., particular edges) in each pixel plane, the location of the edge can be triangulated to derive its 3-space location. Photogrammetry can determine the three dimensional shape of a part without requiring that the light be structured: diffuse lighting can be used. However, without structured lighting, variations in surface reflectivity can cause inspection errors. Photogrammetry is commonly used in satellite and aerial photography to remotely determine the contours of the land below.

SUMMARY OF THE INVENTION

A first aspect of the present invention is to provide a method of analyzing a generalized object to determine its dimensions during inspection based upon its geometric model computer file. The process has three steps: 1) analyze the object's geometric model and determine by simulation which surface or edge points are required for inspection, 2) direct this information to the inspection machine that will extract the 3-space coordinates of the required points from a similar physical object and 3) calculate the dimensions of that object using the measured points combined with the simulation analysis. The analysis of the geometric model can be simplified by identifying surfaces of the object as belonging to a set of primitive components common to manufactured parts such as planes, cylinders, conic sections, spheres, helixes and splined surfaces.

A second aspect is to improve the dimensional resolution of an inspection machine by providing a generalized method of combining the measured locations of surface and edge points of an object giving improved location coordinates of the surface or edge as a whole. One method of combining the points is a "spatial average" where points on a surface or points along an edge are least-squares fit to the geometric model simulation of the same surface or edge. The resolution of locating the surface or edge in 3-space improves inversely proportional to the square root of the number of surface or edge points that are spatially averaged.

Another aspect of the invention is to optimally deploy the data-taking and analysis hardware of an inspection apparatus to reduce the inspection time while still assuring that the inspection resolution is adequate. Analyzing fewer surface or edge points on an object takes less time since each point eliminated requires both less data-taking time and less analysis time. Yet using fewer points reduces the resolution of the object's dimensions because fewer points can be spatially averaged. By developing a mathematical function for the object that characterizes by simulation the expected resolution of each dimension, this function can be optimized to produce the best tradeoff between fast inspection and high resolution inspection.

Another aspect is to provide a method whereby a multiplicity of SLMV sensors inspect many different surfaces of the object simultaneously and which coordinates the inspection data-taking and analysis among several sensors, each sensor composed of a light source and a camera imaging device. Sensors can be deployed in various configurations that allow all sides of the object to be inspected by one or more sensors in a single pass. The process is optimized such that the duration and amplitude of the light source, the speed of the object past the sensors, the alignment of the object and the prioritization of each sensor is found during the setup of that particular object to minimize the data-taking and analysis time. In addition, various novel configurations of sensor deployment provide ways to inspect the underside of the object using mirrors; other configurations reduce the number of sensors used. Part transport mechanisms for moving the object through the inspection region are described. In addition, various methods for moving the camera and/or the light source relative to the object or varying the light source's intensity accomplish fast inspection for situations where the object is stationary.

Yet another aspect of the invention is a method of calibrating individual component as well as the inspection apparatus itself to correct for various errors. In most cases, the part is conveyed past the machine's sensors by a transport mechanism or by a production process. Because the part is clamped into fixtures on the transport mechanism, it can be mispositioned in both translation and rotation. In addition, positional errors in the transport system or production process can produce inspection errors unless compensated. Since the calculated dimensions are based upon a simulation, errors in the relative location of these system components such as the object, the light source and the camera produce inaccurate dimensions. The relative locations of these components can also vary during operation due to differential expansion from temperature changes. The MV camera and the light source produce inspection errors due to lens distortions, pixel location, pixel sensitivity and geometric accuracy of the structured light. The apparatus is calibrated by tests on individual components and on the assembled machine to assure that the simulated dimensions match the actual dimensions of a calibration object placed in the transport system and inspected.

A still further aspect of the invention is a method that simplifies the setup of new objects on an inspection machine. The method disclosed allows an inexperienced setup operator to produce a simplified geometric model from a physical object rather than by downloading a geometric model computer file of the object. First, the physical object is scanned into the inspection machine by transporting it past the SLMV sensor. Next the operator uses a graphical image of the scanned object to identify primitive surface or edge components such as planes and cylinders. It is the geometric relationship between these primitive components that specify the object's dimensions. Last, this information is used to set up the inspection machine to take surface or edge data on the primitive components at the appropriate time and locations to accurately determine the specified dimensions of similarly shaped physical objects.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE PREFERRED EMBODIMENTS

The world of automated inspection is divided into either low resolution but high speed machine vision (MV) systems or high resolution but low speed coordinate measuring machines (CMMs). The preferred embodiment of the present invention uses the same high speed solid state components of SLMV systems (light source and camera). Yet by proper attention to data-taking, the resolution of the inspection has been experimentally been shown to be improved by 10-fold or more. Current MV systems acquire and then evaluate the data from hundreds of thousands of pixels. By contrast, the present invention first analyzes the part's geometric model and then eliminates of the most of the data (often as much as 99%) to be studied in detail. By eliminating both the pixels acquired and the pixels analyzed to just those which contribute to determining the part's dimensions, more of the right data can be analyzed to return dimensions as accurate as those of a CMM as quickly as an MV system.

1. Surface Measurements

The preferred embodiment of the present invention relies primarily on the accurate measurement of surfaces rather than edges. Most objects in the manufacturing world have dimensions that are based either on their surfaces or on the intersections of their surfaces. For example, a prismatic object might have length, width and height dimensions that characterize it. Each of these dimensions is the difference in location between two surfaces. Its length dimension is the distance between its front surface and its rear surface along its length axis; the height is the distance between its top surface and its bottom surface along the height axis. Objects need not have planar surfaces. For example, knowing the radius and axis location of a right cylinder object characterizes the dimensions of the object.

When basing an object's dimensions on surfaces, edges become simply the intersection of two surfaces. An edge of the prismatic object above is the intersection of its top surface and its front surface. Edges of the cylindrical object above are the intersection of its cylindrical surface with its flat ends.

Historically, machine vision (MV) systems have used edge measurements rather than surface measurements to characterize dimensions. Early MV systems used back-lighting that made objects into simple silhouettes of 3D objects that could be analyzed with 2D analysis algorithms called "blob analysis". Later, when front-lighting of objects became common in MV, it was most often used on 2D objects such as flat stampings, wafers or printed circuit boards that again used edges to characterize dimensions.

Figure 1:
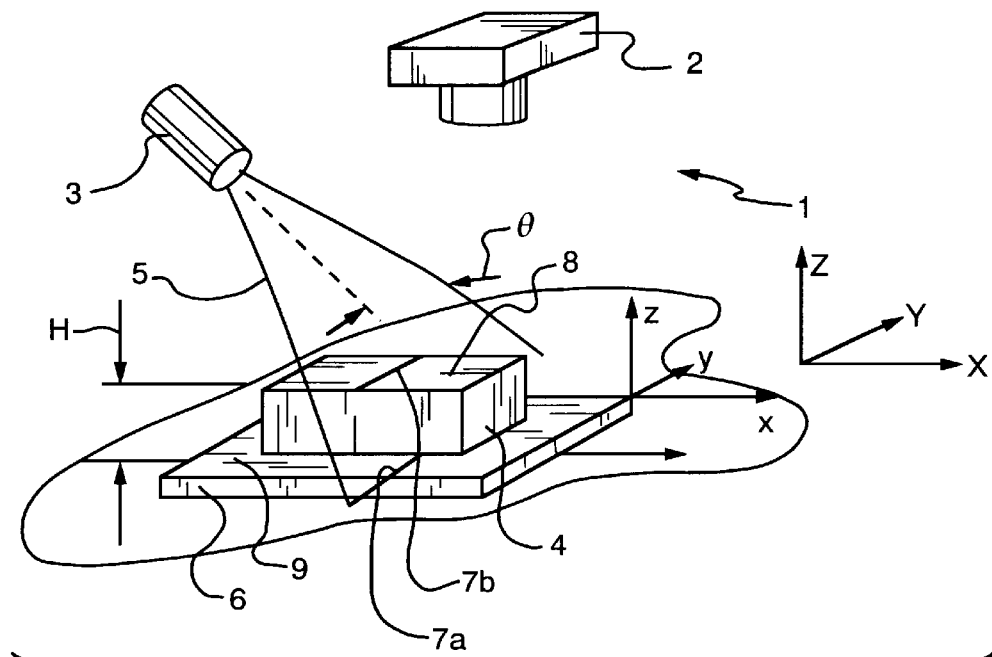
FIG. 1 is an isometric view of a system showing an object being inspected by a camera and a structured light source.

The preferred embodiment uses sensors that directly measure surfaces in three dimensions, although the analysis methods described here also apply to diffuse light sources or edge-based measurement. The preferred sensors combine structured light (SL) with machine vision (MV) to produce a "structured light machine vision" (SLMV) sensor. The simplest embodiment of an SLMV sensor is shown in FIG. 1. The SLMV sensor 1 is composed of machine vision camera 2 and laser line source 3. In FIG. 1, object 4 moves beneath sensor 1 that is held by brackets (not shown). Object 4 is mounted on movable plate 6, which is moved in rectilinear motion by a precision transport system (not shown).

Note that SLMV sensors for measuring objects by triangulation have been in commercial use for decades. It is not the SLMV sensors that are the innovation disclosed, but rather how these sensors are used in conjunction with computer analysis software and part transport systems to effect a reliable and robust inspection machine. Now follows a brief description of how an SLMV sensor determines the 3-space location of points on the surface of an object.

The fixed XYZ coordinate system shown in FIG. 1 has the camera axis pointing in the negative Z direction and object 4 translating in the X direction. The laser line source 3 is located in the same XZ plane as the camera axis, but is inclined at angle θ, typically 30 to 45 degrees, to the camera axis. Laser 3 generates a laser line 5 oriented in the Y direction which intersects the path of object 4 as it passes beneath sensor 1. When laser line 5 intersects object 4, the intersection points on the object 4 are illuminated as line 7a and on the plate 6 as line 7b.

Figure 2A:
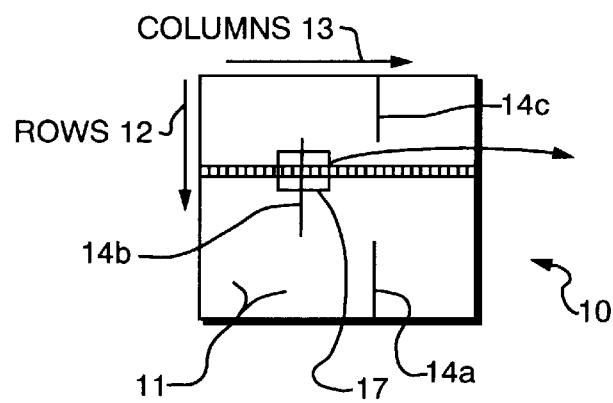
FIG. 2A is a diagrammatic representation of the pixel view of the camera of FIG. 1.

In FIG. 2A, the pixel plane 10 of the camera view is shown. The image of object 4 and plate 6 have been digitized by an array of light sensing elements, called pixels 11, which cover pixel plane 10. Pixels 11 are arrayed in rows 12 and columns 13; each pixel 11 has an associated voltage proportional to the light intensity at the corresponding location in the camera 2 image. The image that is digitized in FIG. 2A is the same image as viewed by camera 2 in FIG. 1 with rows 12 aligned along the X axis and columns 13 aligned along the Y axis. The digitized image of intersection points 7a of laser line 5 onto plate 6 becomes line 14a and 14c in pixel plane 10; intersection points 7b of the laser line 5 onto object 4 becomes line 14b in pixel plane 10.

Figure 2B:
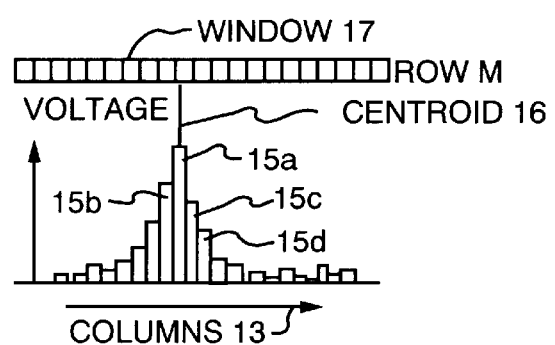
FIG. 2B is a diagrammatic representation of voltages along a particular row of pixels as shown in FIG. 2.

Referring now to FIG. 2B, window 17 is a short length of pixels on a particular row m of rows 12 which contains those columns 13 that include line 14b. Window 17 has been extracted from pixel plane 10 for illustration in FIG. 2B and contains only a few of the many pixels 11 that are contained in row m. Below window 17 is a column-by-column graph of the voltages associated with each pixel 11 of window 17. Pixel 15a has the highest voltage, pixel 15b the next highest voltage, pixel 15c the next highest and so forth. Applying a centroid algorithm to the voltages determines the voltage-weighted centroid location of the pixels 11 in window 17. This centroid calculation is a robust one, as variations in the surface reflectivity (e.g., smears of grease or discoloration) may change the voltage level of the bright pixels in row m, but have little effect on the location of the centroid. Similarly, the centroid calculation is insensitive to whether the surface reflects specularly or diffusely so long as enough light is reflected that the illuminated pixel voltages are much larger than the unilluminated ones. The advantage of using structured light is that the illuminated pixels dominate the centroid calculation since their voltage is so much greater than the unilluminated pixels.

Consider an example of the SLMV sensor applied to an object 4 whose dimensions are 25 mm high, 25 mm wide and 100 mm long as shown in FIG. 1. Object 4 is conveyed by plate 6 past the inspection region (i.e. that region where the laser line 5 intersects object 4) at a uniform velocity of 100 mm/sec. Since the frame rate of many inexpensive charge coupled device (CCD) cameras is set at 30 frames/sec, a frame will be taken every 3 mm along the length of object 4. CCD camera 2 will image top surface 8 of object 4 to produce more than 30 frames which all appear like that shown in FIG. 2A. Most current CCD cameras have an array of pixels 11 that has 512×512 pixels allowing each pixel 11 to cover 0.1 mm×0.1 mm of object 4 when camera 2 field of view covers the width of plate 6 (50 mm×50 mm). In this example, each frame of camera 2 records the image of laser line 5 illuminating object 4 as a set of three values: the column 13 value, the row 12 value and the frame number.

There will be a different set of these three values for each row that is illuminated by the laser line 5. The three values form a 3-space vector (C, R, F) where C is the column value, R is the row value and F is the frame number. Note that the column value C is a fractional number while R and F are integer numbers.

For this simple example the mapping is very simple. The (x,y,z) coordinates of a surface point (based on xyz coordinate frame moving with plate 6) is:

$$x = x_0 + (C-C_0)w + (F-F_0)V/f$$
$$y = y_0 + (R-R_0)h$$
$$z = z_0 + (C-C_0)w \tan\theta \quad (1)$$

where:

$x_0, y_0, z_0$ are the coordinates of the moving xyz reference frame $C_0, R_0, F_0$ are the column, row and frame values of the reference frame origin C, R, F are the row, column and frame values of the imaged surface point x, y, z are the (x,y,z) coordinates of a surface point on object 4 w, h are the pixel width and pixel height as imaged on object 4

V is the velocity (mm/sec) of moving plate 6 f is the frame rate (frames/sec) of the camera

TAN is the tangent operator, and $\theta$ is the angle between camera and light source axes.

In general, the (C, R, F) set of values can be transformed or mapped into the (x, y, z) coordinate system to give the location of "xyz points" on the object 4 surface with respect to the object 4 reference system. Here the term "xyz point" is used to indicate the location in 3-space of a single (C,R,F) data point. The mapping depends on the geometry of the sensor, camera and light source and is valid on any surface of object 4 so long as the laser line or camera image are not occluded by other features of object 4. Simulating structured light source 3 illuminating the top surface of a "parametric" geometric model computer file determines the mapping for a general object 4 in much the same way as Eqn. 1 does for the example object 4 shown in FIG. 1. For a complex object 4, the transformation is quite complex but is of the form:

$$x = g_x(C,R,F,w,h,V,f,\theta)$$
$$y = g_y(C,R,F,w,h,V,f,\theta)$$
$$z = g_z(C,R,F,w,h,V,f,\theta) \quad (2)$$

where:

$g_x, g_y, g_z$ are functional relationships of the row, column and frame values of the imaged surface point, the imaged pixel width w, pixel height h, velocity V, frame rate f and light source angle $\theta$.

Given the simulation transformation of Eqn. 2, the measured (x, y, z) coordinates of object 4 can be compared to the simulated $(x_s, y_s, z_s)$ coordinates of object 4 as specified by the geometric model computer file of object 4. The error between these two can be expressed as a vector between the actual surface point and the simulated surface point:

$$e = \sum_1^N \sqrt{(x-x_s)^2 + (y-y_s)^2 + (z-z_s)^2}\, u$$

where:

x, y, z are the measured coordinates of a surface point $x_s, y_s, z_s$ are the simulated coordinates as specified by the geometric model file e is the distance error vector (mm) between the measured and the simulated coordinates, and u is the unit error vector directed along a line from (x,y,z) to $(x_s,y_s,z_s)$ 2. Spatial Averaging If a single (x, y, z) coordinate value on the surface of object 4 is compared to a single simulated coordinate value, the resolution of the measurement is based on the inherent resolution of the centroid algorithm in determining the location of the laser line 5 intersection with object 4. For current cameras, the single point resolution is, at best, a quarter-pixel for situations where the surface normal is nearly perpendicular to the light source and camera axes. "Quarter-pixel" accuracy means the centroid of the line can be located to within a quarter of a pixel of its actual location. As the surface normal strays from perpendicularity, even quarter-pixel resolution is difficult to achieve.

However, resolution can be improved substantially by averaging more data points in a technique called "spatial averaging". Spatial averaging is a technique similar to the common time averaging where a signal is averaged over a long time period to reduce its noise. In the present invention, instead of averaging over time, the average is carried out over spatial dimensions, i.e. many data points on the same surface are averaged together.

Figure 3:
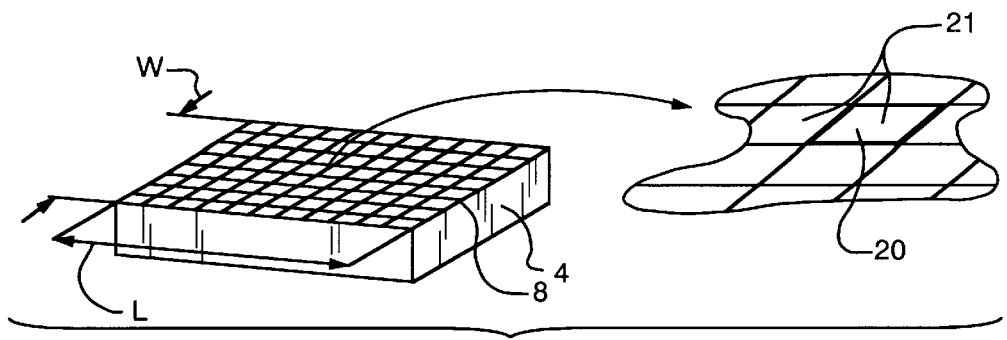
FIG. 3 is a simplified isometric view of surface elements of an object being inspected.

FIG. 3 shows top surface 8 of object 4 with 100 data points taken uniformly over the entire surface. Here, surface 8 has been divided into 100 surface elements 20, or "surfels", by taking its length L and dividing it into 10 parts and taking its width W and dividing it into 10 parts. Each surfel 20 has an (C, R, F) data point 21 taken at its center. Lengthwise, i.e. in the X direction, each data point 21 is 10 mm apart; equal to the 100 mm length divided by 10 parts. Widthwise, i.e. in the Y direction, each data point is 2.5 mm apart; equal to the 25 mm width divided by 10 parts.

For this illustration, a CCD camera with a 30 frames/sec rate will be used, but the concept will also apply to cameras with faster frame rates. When 100 data points are taken, only data from every third frame is required since the image of each frame is taken every 3 mm at the 33 msec frame rate and 100 mm/s velocity of object 4. Only one third of the data needs to be taken since no useful information, i.e. none of the one hundred points 21, are in the other frames.

In addition to reducing data-taking time, the time required for data analysis is also reduced using this method. Of the 512 rows 12, only 10 rows, spaced every 2.5 mm at pixel width 0.1 mm, need have the centroid calculation performed to determine the (C,R,F) values along the width W of surface 8. Instead of calculating the centroid of 512 rows 12 for every frame taken, only 10 rows need be calculated on every third frame: a 150-fold data analysis reduction. Since each centroid calculation can take as long as 250 microseconds on a desktop computer, reducing the number of data points analyzed substantially reduces the inspection time. In the example, each surface can be analyzed in 25 msec (250 $\mu$sec×100 points) or 40 surfaces/sec using a current desktop computer.

In the example, the "simulated" surface of object 4 was a plane parallel to the XY plane. Disregarding errors within the XY plane, each surface point is either above or below the "average" plane; i.e. the average of all the z values of each surface point. Averaging the z error of each xyz point on the plane gives the z location of the plane itself. That is, determine the average error perpendicular to the plane at 100 points over the plane's surface and then average those values.

According to Bessel's formula, resolution of an ensemble of points increases as the square root of the number of points. A plane located by the average of one hundred points on its surface has a location resolution 10 times better than the single point resolution. By taking more data points on the plane's surface, the resolution of the dimensions of the object are improved since most dimensions are based on the location of the surfaces of the object. In the example of FIG. 1, each single data point has a resolution of about 25 microns (quarter pixel resolution of a 512×512 pixel array 10 with a field of view of 50 mm×50 mm). Yet surface 8 is located in the (x,y,z) coordinate frame with a resolution of 2.5 microns, 10 times better, because surface 8 is located by the spatial average of 100 data points. In tests similar to that example of FIG. 1, a planar surface had data points whose +/−3σ error measured 0.02 mm. Dividing the surface into 400 surfels and using 400 measured values located the surface to a resolution of +/−0.001 mm. The twenty-fold improvement is consistent with Bessel's formula that resolution improves as the square root of the number of data points averaged.

a. Shape Primitives of Surfaces

Spatial averaging is essentially a "least squares fit" of the measured data onto a simulated "shape primitive". Shape primitives are the components of a surface shape of an object. Generic shape primitives are planes, cylinders, frustrated cones, spheres, torii, helixes and splined surfaces. For example, a manufactured part may be might be a box-shaped object with rounded corners. Its shape primitives are planes and cylinders since the object can be built up from combinations of these components. Such a part would most likely have been designed by CAD software using the same shape primitives.

In finding the least squares fit of a shape primitive, the calculation is simplified by limiting the number of parameters of the primitive. For example, in finding the best plane representing surface 8, only data normal to the plane's surface need be included in the calculation; i.e. only z values are needed. A generalized plane can be described by an equation with as few as five parameters: the plane's normal direction, as specified by two angles or two direction cosines, and the location of an xyz point in the plane. Similarly a cylinder can be parameterized by its diameter, the direction of its axis as defined by its direction cosines, and xyz values of a point on its axis. Other shape primitives have other independent quantities describing them. A sphere has its radius and the xyz values of its center while a cone has the direction cosines of its axis, its cone angle and the xyz values of its cone point. These quantities are used as the components of a parameter vector (p) that is different for each shape primitive.

b. Sensitivity Matrix

The sensitivity matrix is defined as the sensitivity of each measurement at each surface point location to each of the parameters of the shape primitive:

$$S = \frac{\Delta d}{\Delta p}$$

where:

$\Delta d$ is the change in the displacement of the N surfel points 21

$\Delta p$ is the change in the parameters of the shape primitive, and

S is the sensitivity matrix

Since the geometric model file of the object is known, this sensitivity matrix can be quickly determined by making small changes in the shape primitive parameters and noting how the location of surfel points 21 change. With object 4 in its fixtured position, the error of the N surfel points is zero and the parameter vector has its nominal value, $p_0$. Next, one of the components of the parameter vector $p_0$ is changed by a small amount $\Delta p$ while the others are held fixed. To a first order approximation, changes in displacement of the surfel points 21 will be orthogonal to the surface and hence the change in displacement vector is in the same direction as the local surface normal. The ratio of these changes is an element of the sensitivity matrix corresponding to that surfel point and parameter combination.

Other rows in the sensitivity matrix are filled out by changing each of the other components of the parameter vector in turn and finding the ratio of the change in the associated displacement values of surfel points 21. Since the changes are small compared to object 4 dimensions, the displacement functions are smooth, well-behaved and nearly linear. The sensitivity matrix represents the effect changes in its shape primitive parameters will have on the coordinates of each surfel point. It will have as many rows as there are surfels points 21 and as many columns as there are shape primitive parameters. Note that the matrix must be calculated for each shape primitive used, but the calculation need only be done once since all subsequent inspection using that primitive will be based on the same sensitivity matrix. Using the left minimum pseudo-inverse given by:

$$S^{LM} = [S^T S]^{-1} S^T \tag{5}$$

where:

S is the sensitivity matrix

−1 designates a matrix inversion operation

T designates a matrix transpose operation, and $S^{LM}$ is the left minimal pseudo inverse of S, the parameter vector can be computed as follows:

$$p = p_0 + \Delta p = p_0 + S^{LM}(e \cdot n) \tag{6}$$

where:

$p_0$ is the value of the parameter vector when object 4 is in its fixtured location $\Delta p$ is the change in the nominal value of the parameter vector $S^{LM}$ is the left minimal inverse of the sensitivity matrix S e is the error vector for each surfel point 21 whose magnitude is the distance between the simulated and the measured coordinates (see Eqn. 3)

n is the unit normal vector of the surfel 20

(e·n) is the scalar product between the error vector and the unit normal vector, and p is the parameter vector of the surface primitive that best fits the N measured points.

Note that the pseudo-left inverse $S^{LM}$ shown above calculates the least squares fit of parameter vector p to the error data values e; it specifies the parameters of the best possible surface primitive that matches the measured data, such a surface primitive may be, for example, a plane, cylinder, cone, helix, torus and sphere. Bessel's formula expresses that the resolution of the shape primitive defined by vector p improves as root N. As more and more points are used to define the surface, its shape and location is more accurately known.

Integrating these formulas into practical application produces the following generalized method to improve the resolution of inspection while simultaneously reducing inspection time. First, determine which surfaces are involved in each dimension of interest. Identify each surface as a shape primitive and divide it into N surfers 20 having corresponding surface points 21. Then measure N data points to locate these surfaces to a resolution that improves as root N. Finally, determine the dimensions from the high-resolution surface locations data. Since only the N data points 21 on a surface 8 are needed to determine the object's dimensions, data-taking and analysis time are short and inspection is fast.

For example, in FIG. 1 the height H of object 4 is the difference in z values between the top surface 8 of object 4 and the top surface 9 of plate 6. Taking 100 data points on each surface 8 and 9 determines the location of these surfaces very accurately. Subtracting the z values of each surface finds the height H of object 4 ten times more accurately than the single measurement resolution. At 250 microseconds for each centroid calculation, the 100 data points from each surface can be found in only 25 msec giving an inspection rate of 40 dimensions per second. In comparison, a "touch-probe" type CMM would touch each of the two surfaces 8 and 9 three times to determine the plane of each surface based on the coordinates of the three points. Each point typically takes a second to get an accurate reading. A dimension such as height H on object 4 takes six seconds per dimension or ten dimensions per minute, or one hundred times slower than the present invention. Moreover, using only three points to define a plane can lead to imprecision if the points touched are not representative of the object's surface; e.g. surface roughness or other irregularities, such as burrs, at the point touched. In the present invention, measurements are spread over the entire surface being measured and thus surface imperfections are averaged together giving less weight to any data irregularities.

3. Edge Measurements

Some objects 4 such as stampings are too thin for the surfaces that intersect to form its edges to be accurately sensed using conventional MV systems. As previously noted, SLMV sensors are usually used to determine the locations of surfaces in three dimensions. However, SLMV sensors can also be used to measure edges through the use of edge detection and gradient algorithms.

Figure 4A:
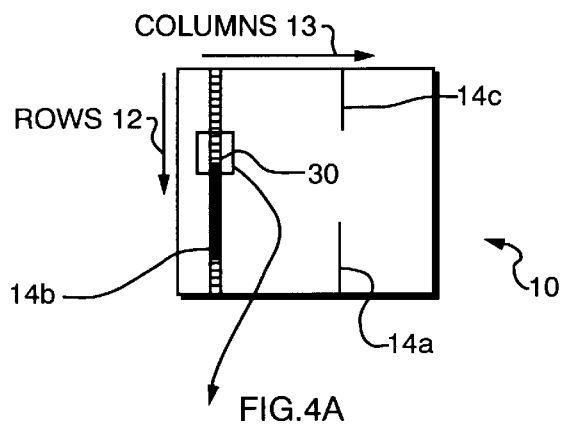
FIGS. 4A, 4B and 4C are a diagrammatic representation of the pixel view of the camera of FIG. 1, and voltages along a particular column of pixels and voltage change, respectively.
Figure 4B:
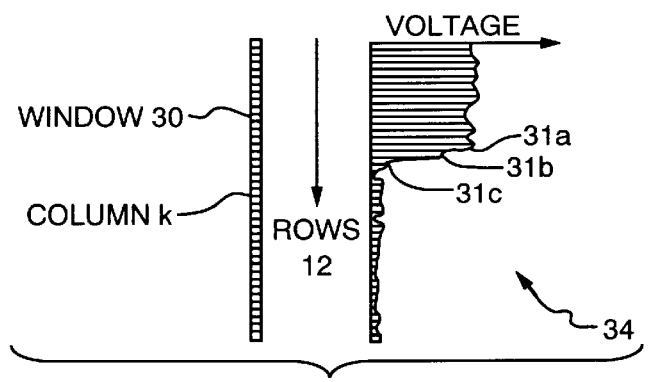
Figure 4C:
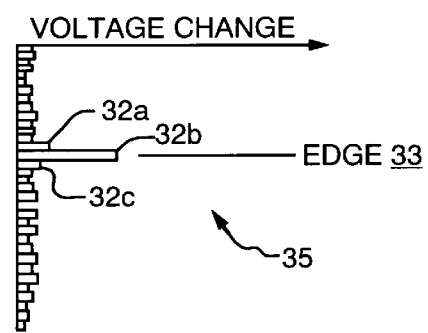

Referring now to FIG. 4A, the pixel image of FIG. 2A is shown with a different region of the pixel plane 10 emphasized; i.e. window 30 rather than window 17. Window 30 also contains portions of line 14b, the image of laser line 5 illuminating object 4. However, in this case window 30 is a short segment of column k, one of the 512 columns 13 of camera 2. FIG. 4B, shown below the pixel image 10, presents the voltages 31a, 31b, and 31c associated with each row 12 of column k. These voltages correspond to the amount of illumination detected by light sensing elements of camera 2, just as voltages 15a, 15b, 15c correspond to pixel voltages of FIG. 2A. FIG. 4C is voltage change graph 35 showing the change of voltage between a pixel and the pixel in the row 12 below, both having the same column value. Notice that voltage change graph 35 identifies the row 12 in which the voltage change is the highest; in this case at the location of the edge of surface 8. To detect the location of edge 33 to better than pixel accuracy, a centroid algorithm can be applied to the voltage changes. The voltage change algorithm of FIG. 4A is the simplest of many "gradient" algorithms commonly used by MV integration engineers for detecting edges of parts under diffuse lighting conditions.

As in surface measurements, edge measurements can also be spatially averaged to improve their resolution. In the example used above, each frame of pixel data 10 has an image similar to that of FIG. 4A. Since the pixel image of line 14 is typically several pixels wide, an independent value of edge location 33 can be extracted for each of several columns 13 for each frame. In the example of FIG. 1, if three to four edge locations 33 are extracted from each frame, then the 30 frames taken of object 4 as it passes beneath sensor 1 could produce 100 separate values of the location of edge 33.

Applying a simulation algorithm of the form of equation 2 converts the (C, R, F) camera values to (x, y, z) coordinates for each column 13 used and for each frame imaged. The error vector e in each of these edge 33 values can be found by subtracting the simulated $(x_s, y_s, z_s)$ coordinates taken from the geometric model computer file of object 4 using equation 3.

Shape primitives for edges can be straight lines, conic sections such as circles, ellipses, parabolas, or hyperbolas, helixes, or generalized space curves, each having their own number of independent quantities or parameters. For example, a straight line such as edge 33 of surface 8 has six independent parameters in its p vector: the three coordinates of each of the line's two end points. As with surfaces, an edge can be least squares fit to its shape primitive by first dividing the edge segment into N pieces with an edge point centered on each segment. Then, its sensitivity matrix S is determined by making small changes in the parameter set that makes up the components of its parameter vector p and finding the corresponding changes in the N edge point locations. Taking the left minimal pseudo-inverse $S_{LM}$ of the S matrix and multiplying that by the error vector e, from equations 5 and 6 above, gives the best fit of a straight line primitive to the measured points. As in spatial averaging of surfaces, the resolution of the edge's location improves as root N. In our example of FIG. 1, if N represents 100 edge 33 values of top surface 8, then the resolution of the least squares fit location of edge 33 is 10 times better than a single value.

Edge locations can be used to extract dimensions from parts, but they are often not as accurate as surface-based dimensions. First, most edges are not sharp as a common practice is to break corners of parts to prevent cuts from sharp edges. When an edge is rounded, a dimension based on its location is offset by the round's radius. Second, for a given inspection speed, surfaces divided into many surfels require less data-taking time than an edge divided into as many segments. For example, if edge 33 in FIG. 4A were 25 mm long instead of 100 mm long, it could not be divided into 100 segments unless the transport moved slower. Yet surface 8 could still be easily divided into 100 surfels. Third, many parts plastic or metal parts which are cast or molded have "draft"; i.e. surfaces sloped away from the mold sides to assure that the part can easily be extracted from the mold. When an edge is defined by a surface with draft, the edge view of the drafted surface is difficult to measure.

a. Minimizing Window Size

In both the surface centroid algorithm of FIG. 2A and the edge detection algorithm of FIG. 4A, windows 17 and 30 do not represent an entire row m or column k of the pixel plane 10. Object 4 and other similar objects 4 having nearly the same shape are located on movable plate 6 with reasonable accuracy. The clamping mechanism (not shown) that mounts object 4 to plate 6 uses spring or pneumatic pressure to hold object 4 against mechanical stops that can locate a typical fist-sized object 4 accurate to +/−0.25 mm in the three primary X,Y and Z directions. The object 4 can be removed and replaced with little positional variation of object 4 relative to plate 6. Object 4 can also be replaced by other similar objects 4 with little positional variation relative to plate 6. Under these conditions, the location of image 14 of laser line 7 in FIG. 2A or FIG. 4A is known to some precision. In our example where each pixel represents 0.1 mm on object 4 (that is, h and w of Eqn. 1, 2 equal 0.1 mm), a location accuracy of object 4 of +/−0.25 mm means centroid 16 or edge 33 values could vary by 5 pixels due to location errors. Hence windows 17 and 30 need only cover perhaps +/−10 pixels from its expected location based on its geometric model file simulation. Of the hundreds of pixels in column 13 or rows 12 only a small percentage need be included in the centroid or edge algorithm. If line image 14 is not located within its expected window, an error has occurred. Such an error could result from the object being grossly mispositioned or the wrong object being measured.

However, the most important reason for limiting windows 17 and 30 to the minimum required is the avoidance of errors due to spurious reflections. When a structured light source is used, especially on spectrally reflecting objects 8, the light may reflect from one surface of the object to another. Instead of a single intersection of line 5 with object 8 producing only one reflected line 14a . . . 14c which crosses each row 12 in FIG. 1, several lines cross each pixel row 12. These spurious reflections produce large errors in the calculated range since the light does not emanate from the correct direction. Because these spurious row crossings are seldom close to the correct crossings, analysis of only the "expected crossing region" in windows 17 and 30 can eliminate most of the error due to spurious reflections.

Reducing window 17 and 30 size to a minimum is also valuable when several sensors are used (as discussed later). In these cases, the structured light 5 from one source 3 may inadvertently illuminate a surface within the pixel plane of another camera 2. Again, analysis of only the expected crossing region can eliminate these errors, though such clashes may also be eliminated by simply eliminating regions with multiple crossings.

Reducing the number of pixels 10 that must be included in windows 17 and 30 has important hardware considerations for reducing inspection time. Other cameras that are not based on the charge coupled device (CCD) principle do not require that an entire frame be captured at the same time. Charge injected device (CID) cameras or CMOS photodiode cameras allow the illumination voltages of a select group of pixels to be taken without waiting the typical thirty-three msec for the entire frame to be captured. In these cameras, data acquisition time is approximately proportional to the number of pixels that are acquired. By reducing the number of pixels needed to the bare minimum, the inspection speed can be significantly improved.

Data analysis time may also be improved by utilizing smaller windows. Once an image has been captured by camera 2, whether a CCD camera or otherwise, the image is transferred to computer memory and stored for later analysis. Centroid and edge algorithms are available as hardware circuits that can find the centroid or edge location of a window of pixels much faster than can be done in software by the system's computer. The hardware execution time is proportional to the number of pixels in the window and, thus, keeping window size to a minimum again improves inspection speed.

b. Setup and Run Software

The process of inspecting a dimension becomes a three-step process involving simulation, inspection and dimension. In the first, or setup step, the geometric model of the object is analyzed by simulation to find which dimensions are required to be inspected. The dimensions direct which surfaces or edges are involved and which points on each surface or edge need to be acquired. Simulated point information is converted to windows of column, row and frame values where the laser line is expected to intersect the fixtured object. In the second step, performed after setup is completed, illumination data is acquired from the windows and centroid or edge algorithms are performed by hardware or software to extract the 3-space coordinates of the required points. In the third step, the dimensions themselves are extracted from the 3-space point data by determining the error between the simulated points and the measured points. These errors are converted into "best fit" shape primitive parameters that can then be used to accurately find the dimensions of the object.

The calculations required by the method can be divided into two phases: calculations performed by setup software and calculations performed by inspection software. Setup software is done only once for each part number while inspection software is done once for each part inspected. It is inspection software that determines the inspection rate of the machine. The task of setup software is to precalculate as much as possible so that the inspection software can run quickly. In the simulation phase, setup software includes geometric model simulation of the object 4, laser line 5 and pixels 10 of camera 2. It uses the simulation and the dimensional requirements to compute a "look-up table" or LUT of column, row and frame data that is used by the inspection software to speed up data-taking during the inspection phase. Window locations and algorithms are predefined to calculate the light line's location during data-taking. Time-consuming matrix inversion calculations are done during setup but only fast matrix multiply algorithms need be done during the dimension extraction phase.

4. Multiple Sensors

The simple inspection machine of FIG. 1 can only detect dimensions in one direction, the Z direction. Such a machine could measure simple defects: rotationally symmetric shapes like screw machine parts or connector contacts with out-of-plane defects. It could also be used to inspect dimensions in several passes by measuring dimensions on one face, then repositioning the part and inspecting other faces as required.

Figure 5:
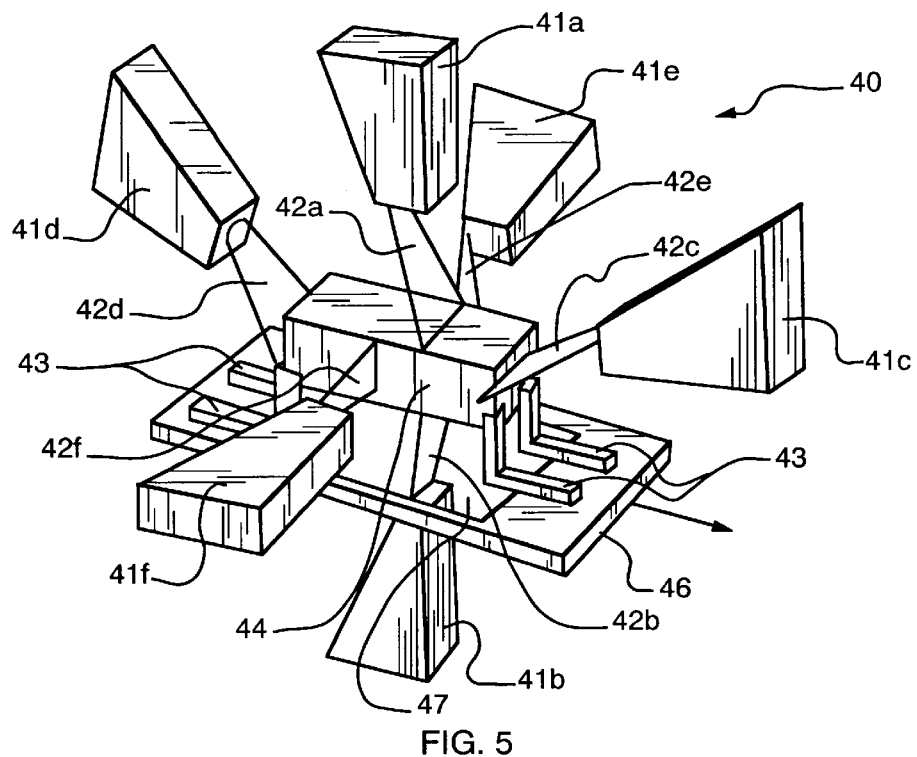
FIG. 5 is a simplified isometric view of a system having multiple camera/light source sensors for inspecting all sides of an object in a single pass.

However, to achieve the highest inspection rates, all dimensions should be measured on a single pass. Since most manufactured parts have six faces from which dimensions are taken (top, bottom, front, back, left side, right side), a machine with six separate sensors could cover all faces in a single pass. FIG. 5 illustrates a 6-sensor machine 40 with each sensor 41 having its own structured light source and camera. As in FIG. 1, a laser line source is the preferred embodiment of the structured light source, but other light sources, such as diffuse or Moire, could also be used.

As in FIG. 1, object 44 being inspected is clamped with reasonable accuracy by clamps 43 onto moving plate 46 to convey object 44 past sensors 41. Plate 46 moves on a precision transport system (not shown) making its trajectory past sensors 41 very repeatable. Six sensors 41 image six different faces of object 44: sensor 41*a* the top face, sensor 41*b* the bottom face, sensor 41*c* the front face, sensor 41*d* the rear face, sensor 41*e* the left side face and sensor 41*f* the right side face. Each sensor has an associated laser line structured light source 42 and camera (not shown). Note that plate 46 has an opening 47 through which sensor 41*b* can illuminate and image the bottom face of object 44; clamps 43 are also designed to neither obstruct illumination nor image of the bottom face. It is further noted that sensors 41*c* and 41*d* are above the plane of the top face of object 44 so that object 44 has an unobstructed path past all the six sensors 41.

The machine 40 of FIG. 5 is not the only multi-sensor configuration possible, but is merely a representative arrangement of sensors 41. An arrangement such as configuration 50 in FIG. 6A requires only two sensors 51, each sensor covering three faces of object 54. As in FIG. 5, object 54 is mounted above plate 56 with clamps (not shown). Plate 56 is a precision reflector which reflects the structured light from sensors 51 to illuminate the bottom face of object 54; cameras of sensors 51 extract dimensions from the bottom face via reflected image 55. In a preferred embodiment, reflecting plate 56 is fabricated from a precision front-surface mirror, which is precision ground and vacuum-coated with a reflective coating, to simplify the simulation of object 54 image during the analysis phase. The mounting clamps (not shown) which suspend object 54 above reflecting plate 56 are designed to minimize illumination and image obstruction in a similar manner as clamps 43. Sensor 51*a*, represented by a directed arrow in FIG. 6A, inspects the top, bottom, front and left side faces of object 54. Sensor 51*b* inspects the top, bottom, rear and right side faces of object 54. Some faces such as the top and bottom are measured by both sensors giving some redundancy to the measurements and helping to align one sensor to the other. Configuration 50 reduces the cost of the inspection machine by having fewer sensors 51. It has two disadvantages: analysis is more complex and its surfaces are measured by sensors 51 whose angles are not nearly as orthogonal as those of sensors 41 in FIG. 5.

Figure 6A:
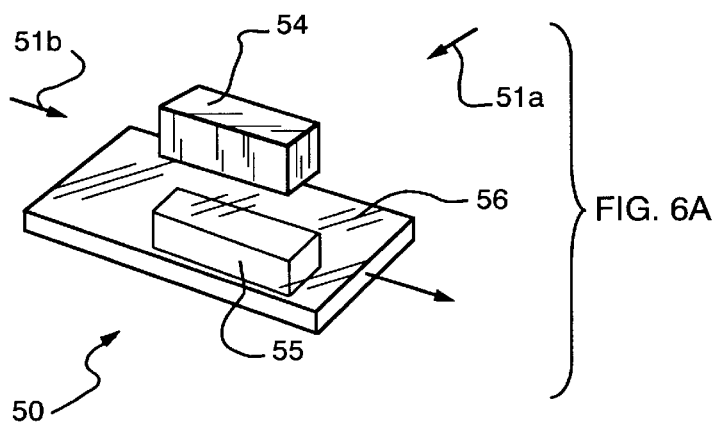
FIG. 6A is a schematic illustrating how inspection sensors can be deployed using mirrors to reflect some surfaces of the object.
Figure 6B:
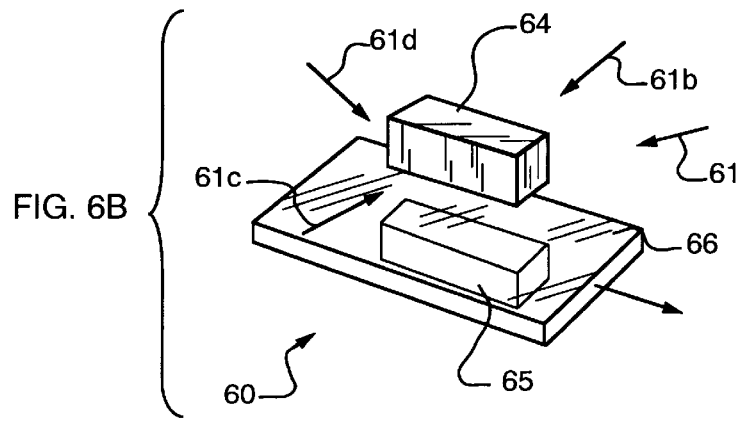
FIG. 6B is another schematic illustrating how inspection sensors can be deployed using mirrors to reflect some surfaces of the object.

Similarly, configuration 60 in FIG. 6B uses four sensors 61 to extract dimensions from object 64 and its image 65. As in configuration 50 of FIG. 6A, object 64 is suspended above precision reflecting plate 66 that transports object 64 past sensors 61. Sensor 61*a* inspects the top, bottom and front faces, sensor 61*b* inspects the top, bottom and left side faces, sensor 61*c* inspects the top, bottom and right side faces while sensor 61*d* inspects the top, bottom and rear faces of object 64. This configuration has more redundancy than configuration 50, i.e. several faces are inspected by multiple sensors 61, but doubles the total sensor 61 costs.

A variation of the arrangement in FIG. 6B, has the object 64 mounted on a rotary table (not shown) which itself is mounted on moving plate 66. As object 64 rotates, all its surfaces have the possibility of being inspected by a single sensor such as sensor 61 *a* inclined at an angle to the rotational axis. In this situation, the distance between object 64 and sensor 61*a* can be held nearly constant by a combined translation and rotation motion of object 64. Since SLMV sensors have a limited depth of field, the ability to maintain surfaces within the depth of field provides improved resolution. For example, if a long narrow object such as object 64 were to simply rotate, its forward face might be out of focus when its side faces were in focus. By moving the front face into focus by translating front face of object 64 further from sensor 61*a* during its inspection and closer to sensor 61*a* during the inspection of the side faces, surfaces can be held more closely in focus and better results may be achieved.

a. Part Transport

Figure 7:
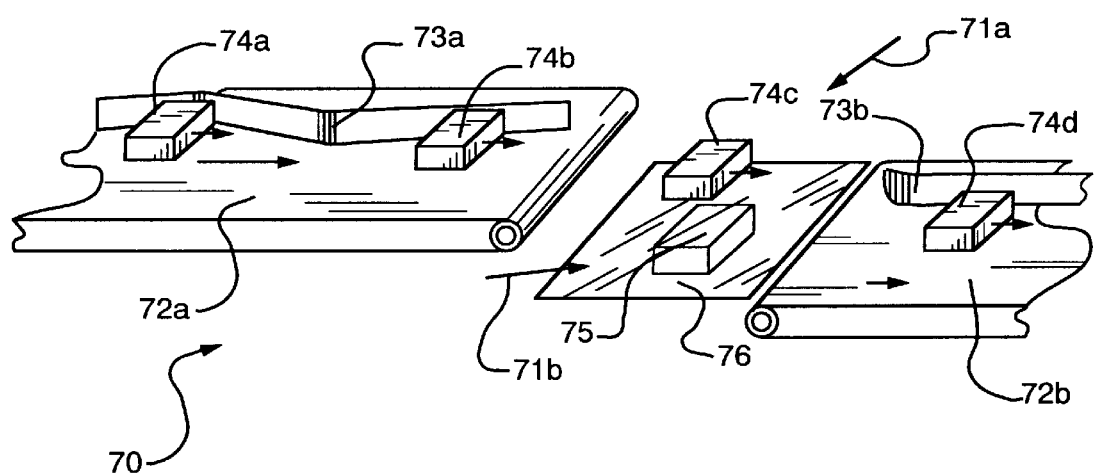
FIG. 7 is an isometric view of a part transport system modified to inspect parts that pass by the system's sensors.

FIG. 7 shows an embodiment of the present invention in which the object 74 being inspected is not mounted on a transport plate. In this case, objects 74 are transported on conveyor 72*a* with a high enough velocity to be launched from the end of conveyor 72*a* and land on conveyor 72*b* which transports the objects 74 from the machine 70. As objects 74 fall from conveyor 72*a* to conveyor 72*b,* they pass by sensors 71 (represented by directed arrows 71*a* and 71*b* in FIG. 7) which extract their dimensions. The sensor configuration is the same as that shown in FIG. 6A where two sensors 71*a* and 71*b* inspect all six faces of objects 74. Reflector 76 reflects the illuminating light source from sensors 71 and extracts dimensions from their image 75. Part handling is aided by fixed guide fences 73. Fence 73*a* has a serpentine shape that pushes objects 74 across conveyor 72*a* such that all objects 74 have the same orientation and are all aligned with reasonable accuracy to sensors 71. Object 74*a* is about to be pushed in the cross belt direction by conveyor 72*a* to take the position of object 74*b* which in turn is about to be launched past sensors 71. Object 74*c* has been launched on its trajectory past sensors 71 where it is inspected by sensors 71. Object 74*d* is shown being transported away from the inspection region by conveyor 72*b* after landing.

Other part transport methods may be necessary to transport other shaped parts. For example, parts that roll need to have conveyors 72 tilted slightly toward fences 73 to let them roll against fences 73 for accurate alignment prior to launching. Another variation of inspection system 70 has objects 74 that are conveyed by a part feeder into a gravity chute that launches the objects 74 past sensors 71 after sliding down the gravity chute.

In addition, instead of the part being launched past sensors 71 as in FIG. 7, the part may be robotically transported past SLMV sensors. For example, when parts are machined in a modern machining center, they are often removed from the machine by a robotic parts unloader for palletizing. As the robot grasps the finished part, the robot may pass the part past sensors that inspect its surfaces. As in FIG. 7, most surfaces of the part are exposed to sensors and can be inspected, excepting those surfaces that are occluded by the robot grasping mechanism.

Yet another variation of part transport has objects 74 which are inspected by sensors 71 as they are conveyed on a belt transport like conveyor 73. In this embodiment, not all faces are exposed, so dimensions are extracted from faces that are exposed to sensors 71. Inspection of objects 74 by variations of system 70 may not be as accurate as inspection by configurations 40, 50 and 60, but would likely be adequate for many inspection tasks.

b. Measuring Stationary Parts

In many production processes such as stamping, forming, grinding, machining, feeding and assembly, parts are transported by the production mechanism itself. Inspection of the type described here can be incorporated into the production machinery so that parts are inspected during their manufacture. For example, to inspect an assembly for proper insertion of components, sensors installed between assembly stations measure the height dimension of each component as the assembly passes to the next station. In another example, sensors built into stamping dies measure dimensions of stamped parts between strokes of the stamping press.

In most of the above production processes, the part's motion can be divided into a stationary phase, when the part momentarily stops, and a motion phase when the part moves to the next station. Although the location of the part is held very precisely during the stationary phase of the cycle, during the motion phase little attention is paid to precise location. Indeed, part pallets are commonly shot-pinned into position accurate to +/−25 microns during the stationary phase, but pins are pulled and the part lurches and vibrates to the next station. To give the highest resolution inspection, the proper time to inspect production parts is during their well-located stationary phase, not during their loosely-located motion phase. Here, the sensor has too much inertia to scan a part's surface during the short stationary phase, so the camera portion of the sensors remain fixed over the part's stopped position while the laser light line is moved over the stationary part. Such a rapid movement of a line or point of light over a surface has been in common use for decades in bar scanners, laser marking devices, laser cutting equipment, laser printers and laser scanners, etc.

In another embodiment, a rotating mirror or specially designed lens placed between the laser light source and the object reflects or refracts to move the laser light over the part in a scanning fashion. Other embodiments use a torsionally oscillating mirror to achieve the same purpose, i.e. quickly moving the light illumination over the surfaces of the part. Since the mirror or lens has a much lower inertia than the sensor itself, the light can move over the part's surface much more quickly in a production process. Of course, the geometric model simulation must also simulate the location of the light line or spot illumination in both time and space to accurately measure the part by the described techniques.

c. Illumination Control

Whether a laser line or a moving laser spot is used as the structured light source 3 (FIG. 1), the amount of Illumination projected onto object 4 may need to be controlled. When a surface 8 of object 4 reflects diffusely, the line 7 reflects light in all directions which produces voltage variations 15 in camera 2 such as those in FIG. 2A. However, when surface 8 is shiny it reflects spectrally; i.e. most of the light is directed at a reflectance angle equal to the incidence angle, measured relative to the surface normal. Two problems occur: too little light is reflected into camera 2 under normal measuring conditions and too much light is reflected into camera 2 under adverse conditions, potentially damaging it. Variations of light intensity of more than four orders of magnitude ($10^4$) are possible for very reflective surfaces. Although moderate variations in intensity can be handled with frame-by-frame amplitude control of the camera 2, such large variations in intensity require other alternatives.

Both problems can be minimized with source illumination control varying the illumination of light source 3. For the case of laser light sources 3 (FIG. 1), the power to laser 3 is modulated to reduce the intensity of the incident light 5. During the setup phase of the part, the intensity is adjusted for each pixel plane 10 of camera 2 as object 4 passes beneath. One method is to initially set the light intensity at a low value for each new frame to assure no damage to sensitive light sensing elements of camera 2. The illumination voltage 15 (FIG. 2A) is sensed for all pixels 11 and the intensity increased until the brightest pixels 11 have high voltages 15 to allow accurate location of centroid 16 or edge 33. Several passes of object 8 past camera 2 may be required to iteratively adjust the illumination of each frame. Once the intensity values are found for each frame, they are stored along with the locations of windows 17 (FIG. 2A) in the LUT as discussed in Setup and Run Software. When a particular frame is imaged by camera 2, the intensity is changed to the value previously determined in the setup phase. Laser light is particularly well-suited to illumination control because its intensity can be quickly changed. Voltage modulation of today's laser light sources can change their intensity 100 fold in a few microseconds.

When a scanning laser spot is used in place of a laser line light source, even more sophisticated illumination control is possible. Consider laser 3 (FIG. 1) to be a scanning spot laser that produces illumination line 7 on surface 8 by quickly moving a laser spot over the path of line 7. Generally the scanning speed of a laser spot scanner 3 can be changed much more quickly than the object 4 moves past camera 2, and thus object 4 can be thought of to be nearly stationary as it is scanned by the spot. Under these circumstances, the amount of time that the laser spot spends crossing row m of pixels 11 (FIG. 2A) is directly proportional to the voltage 15 sensed in window 17 (or window 30 of column k in FIG. 4A). The sensing element of a pixel 11 integrates the light intensity that falls on it over time to produce voltage 15 from which centroid 16 or edge 33 is extracted. If the spot moves slowly over line 7, voltage 15 is proportionately greater than if the spot moves quickly. Consequently, the intensity can be modulated individually for each window 17 or window 30 of the LUT for object 4 by controlling the speed of the spot. For highly specular surfaces 8 that reflect little light into camera 2, the laser spot moves slowly, while the spot moves quickly for diffuse surfaces 8.

By combining scanning speed modulation with voltage modulation of the laser's intensity, even greater illumination control can be achieved. For example, in some situations, multiple reflections from specular surfaces 8 of a complex object 4 can cause the light of a laser spot to fall directly onto camera 2 sensing pixels 11 which can damage them. By sensing these situations at low light intensity during the setup phase, the spot can be turned off (i.e., intensity set to zero) to prevent damage at higher light intensities. This process is similar to that of industrial marking and welding lasers, which adjust their illumination intensity both by modulating the light intensity and by adjusting the scanning speed of the spot. To mark or weld the part, they use a high intensity and slow scanning speed. Then they switch to low intensity (or turn off the laser) and quickly move to the next marking or welding segment. In a similar fashion, the present invention moves the laser spot to one of the preselected windows 17 or 30 and adjusts light intensity and scanning speed to the proper level to obtain accurate xyz measurements. Then it moves to the next window 17 or 30 at low (or no) intensity and high speed to minimize extraneous reflections and continues the process.

d. Large Objects

The techniques described here do not require that the object being inspected move past the sensors. For large objects such as automotive and aircraft assemblies, the sensors can be transported past the objects on precision translation mechanisms. In this case, the object remains stationary and one or more SLMV sensors are moved into its proximity.

Although the technique was designed for fast inspection of relatively small objects, it also provides accurate measurements of very large objects such as buildings and bridges through spatial averaging. When the object is stationary, the structured light line is replaced by a structured light spot. By scanning the spot over the building's surfaces with a precision theodolite, the measured intersection point of the laser spot can be compared to the expected points from a CAD model of the building or compared to previous measurements taken on the same building to detect construction errors, earthquake damage or settling.

The variations discussed above of the basic scanning method shown in FIG. 1 do not suppose that these scanning variations are, in themselves, new inventions. Many have been used for decades to measure 3D range data on industrial parts. The innovation of the present invention is based on how structured light scanning in combination with the analysis techniques described here permit fast and accurate dimensional inspection. The important issue is not how the structured light or object moves, but that there is relative motion between the two.

e. Multiplexing Sensors

Multiple sensor arrays such as configurations 40, 50, 60 and 70 allow all sides of an object to be inspected in a single pass. Not only does this reduce the inspection time, but it also improves the flexibility of the inspection. Many manufactured parts have reference surfaces from which dimensions are referenced. Reference surfaces are often on the opposite face of the part than the surfaces associated with many important dimensions. Having the ability to measure all faces of a part insures that dimensioning is relative to reference surfaces.

Figure 8A:
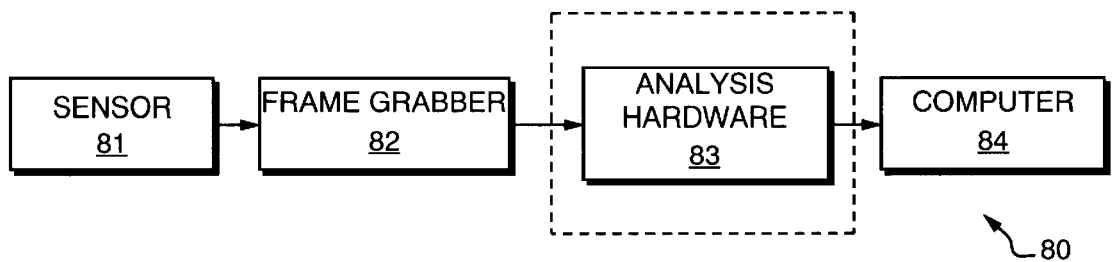
FIG. 8A is a schematic diagram of a method for multiplexing several sensors in electrical hardware.

However using multiple sensors means that the various sensors must be coordinated by the system's hardware and software. A typical machine vision system using a single CCD camera is shown in FIG. 8a. System 80 has an MV sensor 81 that converts the illumination map of the image to voltages as shown in FIG. 2A. "Frame grabber" 82 digitizes these signals as they arrive serially from sensor 81 and stores them into its own memory. Optional analysis hardware 83 analyzes the important windows of the image for centroid and edge locations using hardware algorithms. Finally, computer 84 converts the centroid and edge locations to xyz points by algorithms similar to Eqn. 2; after least squares fitting of the data to the surface and edge primitives, dimensions are calculated from the surface and edge parameters (see Eqn. 3–6).

Figure 8B:
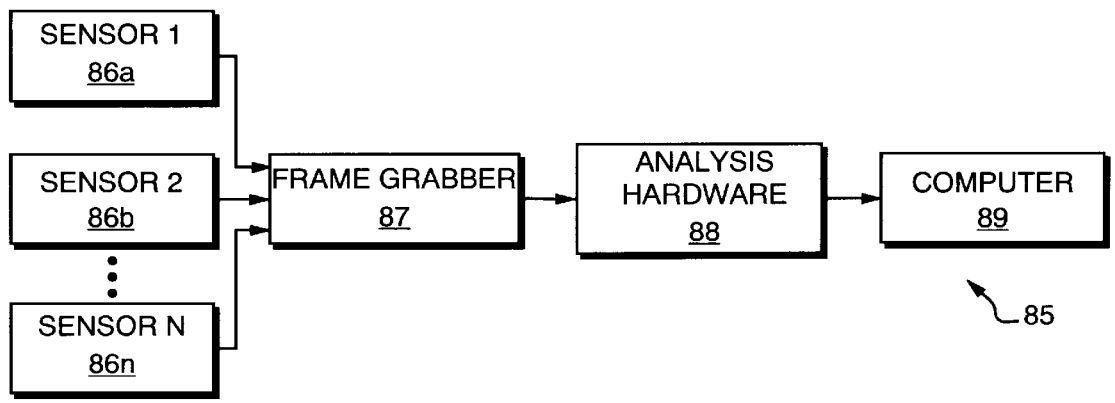
FIG. 8B is a schematic diagram of another method for multiplexing several sensors in electrical hardware.
Figure 8C:
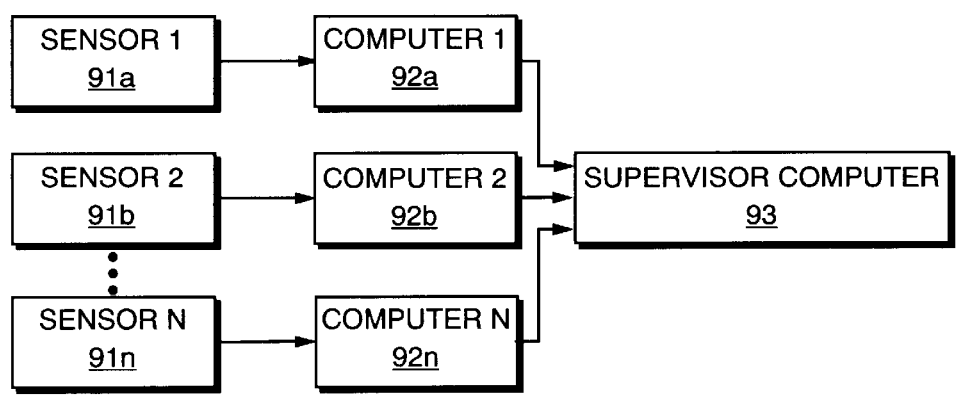
FIG. 8C is a schematic diagram of still another method for multiplexing several sensors in electrical hardware.

Alternately, several sensors 86a . . . , 86n can simultaneously take data and transfer the important portions of each sensor's image to the frame grabber 87, as shown in system 85 of FIG. 8b. Since each camera's row, column and frame values (C, R, F of Eqn. 2) contain valuable xyz location information that already has been determined during the part's setup phase, the computer 89, or an independent computer, can coordinate which portion of which sensor at which time is to be sent to the frame grabber 87 for further analysis, cameras, which can acquire a few rows of data at a time, are well suited for this architecture. Yet another hardware architecture is shown in FIG. 8c. Here, each sensor 91a . . . 91n has its own associated computer 92a . . . 92n. Each computer 92a . . . 92n has the capability to independently calculate xyz points from its associated camera. In some architectures, the information passed to the supervisory computer 93 is the laser line intersection values as calculated by associated computers 92a . . . 92n. Since most of the centroid or edge processing is done prior to transferring to the supervisory computer 93, little multiplexing of its time is needed. This architecture is well suited to CMOS cameras having associated computers that compute a very high number of xyz points each second.

f. Optimizing Multiple Sensors

Figure 11:
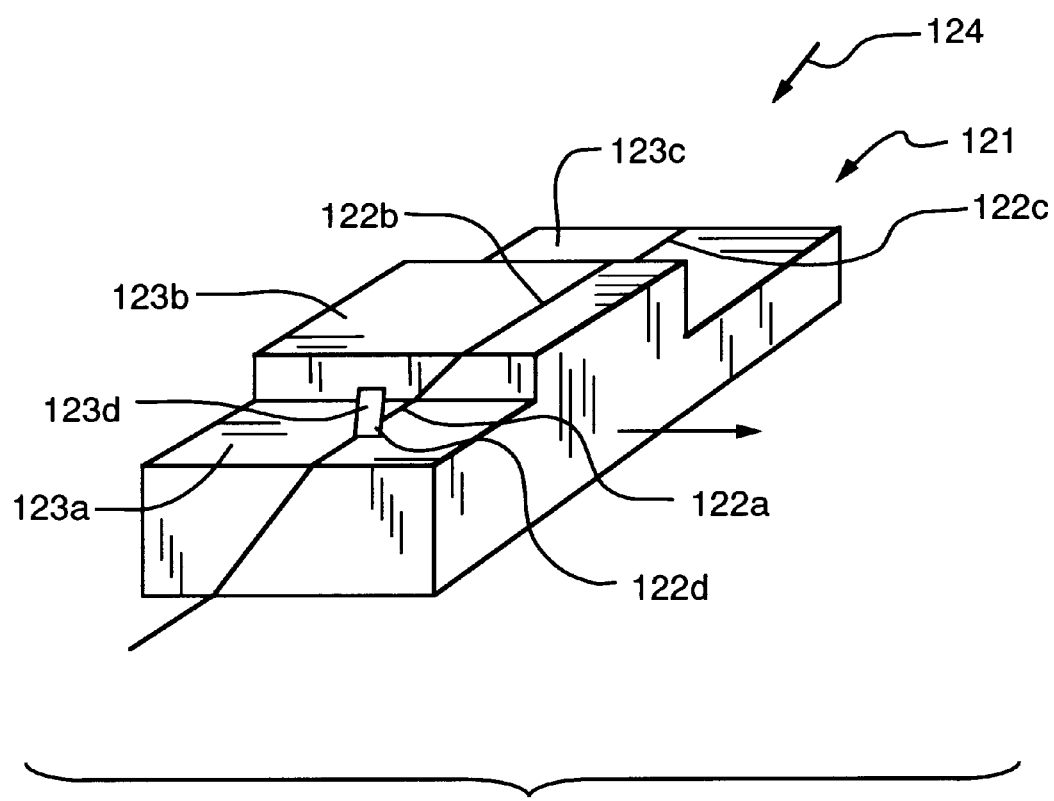
FIG. 11 is an isometric view of an object being inspected having surfaces of various size.

Regardless of the type of sensor architecture, optimization of the sensor data-taking can reduce inspection time. Data rates, measured as the number of xyz points acquired per second, cannot exceed the data acquisition rate of the sensor and computer system as even the fastest sensor has some limiting data rate due to either camera sensitivity, digitization rate or computation time. High data rates occur under several circumstances. Consider FIG. 11 where object 121 is located beneath sensor 124 deployed at 45 degrees to the vertical. Sensor 124 has a scanning laser light source that illuminates a single light line 122a . . . 122d on surfaces 123a . . . 123d and which moves at a uniform velocity across object 121. Some of these surfaces such as locating pin 123d have a small surface area and others such as 123a have large areas. Since both small surfaces and large ones require that many xyz points be averaged to produce high resolution, a smaller surface has a much higher data rate than a large one, i.e. its xyz points may be acquired in a much shorter time than a large surface.

For example, if the locating pin of surface 123d is 1 mm in diameter by 2 mm high and laser line 122 moves over object 121 at a uniform 30 mm/sec, then a CCD camera of sensor 124 operating at 30 frames/sec could only acquire only two frames of data in which line 122d intersected the surface 123d. If the camera had a field of view of 50 mm×50 mm, each camera pixel would represent 0.1 mm×0.1 mm and fewer than 20 laser line intersection points could be acquired as line 122 passes by. If 100 xyz points are to be acquired from each surface of object 121 to produce the necessary inspection resolution, clearly pin 123d will have too few xyz points for the required resolution. However, adjusting the velocity of the moving line 122 to be slower when data rates are high (and higher when data rates are low) can insure that enough data points are acquired on each surface to give the required measurement resolution. In the example above, the line can scan at 100 mm/sec over surfaces 122a, 122b and 122c where the xyz points are sparse (they are evenly spread over a large surface) and data rates are low. When line 122d arrives at surface 123d, the line velocity slows to 5 mm/sec to allow 100 xyz points to be acquired for this small surface as well. Facsimile machines use a similar strategy: when information rates are high (i.e., the row being scanned has many dark to light transitions) the paper feeds slower. When object 4 rather than illumination line 7b moves as in FIG. 1, its velocity can be increased for low data rates and slowed for high data rates.

In addition to varying the speed at which the laser line moves over object 121, data-taking of sensor 124 can be optimized during the setup phase of object 121. In optimization, the xyz points are deployed on their surfaces 122 to minimize the data rate requirements of the system as a whole. Suppose the maximum data rate of the system above were one xyz point per msec. To optimize the deployment of xyz points, when laser line 122d arrives at surface 123d only xyz points on surface 123d should be acquired. The complete resources of the system should be used to handle the highest priority: getting data from the smallest surface. Hence the xyz points on large surfaces 123a . . . 123c are postponed, or shifted to other times during the scan, to reduce the system data requirements at this critical time.

The deployment is done as part of the setup phase. In general, the optimization is a complex multi-pass process where the locations of xyz points on each surface are adjusted iteratively on each pass to minimize the inspection time. However simple algorithms can produce near-optimum results for many objects 121. One simple algorithm for CCD cameras associates each window 17 of pixel row 12 (FIG. 2A) with a probability function r which is inversely proportional to the surface area and the number of xyz points left to deploy on surface 122:

$$r = \left[\frac{N_K}{(R_K C_K)}\right] \quad (7)$$

where:

$N_K$ is the number of xyz points per surface required $C_K$ is the number of possible data columns 13 on surface 122 (width of surface in pixels divided by the number pixels between frames)

$R_K$ is the number of possible data rows 12 on surface 122 (height of surface in pixels), and r is the probability that a particular pixel will be chosen as an xyz point In equation 7, the right side of the equality is the raw probability of choosing a particular pixel as a xyz point. The numerator is the number of xyz points required to get the specified resolution while the denominator is the total possible xyz points based on the speed of object 121 and the size of surface 122 in question. The xyz points in the LUT are picked by choosing a uniform random number for each possible row on surface 122. If that number is greater than r then that row 12 is added to the LUT; if not, the row 12 is discarded. Equation 7 chooses xyz point locations without regard to other limitations of the data-taking and processing system. However in most actual implementations there are limitations. These limitations include the number of xyz points that can be acquired on each pixel column, the number of pixel rows that can be captured on a narrow surface such as surface 123d and even the total number of xyz points which can be processed in each pass by the analysis computer.

In optimizing the more general case where limitations exist on several components, optimization algorithms are used. These algorithms define the time requirements of all components and simulate the data taking and processing. Each possible schedule of xyz points produces a "cost function". Schedules with the highest cost function are those which have both high speed and high accuracy. The optimization algorithms search alternate schedules seeking the highest cost function.

5. Compensation And Calibration

For a machine to accurately and repeatably report the dimensions of an object according to the methods described above, it must be accurately compensated for errors. Repeatability errors may be of two distinct types, systematic errors and random errors. Systematic errors are ones that are repeatable, ones that can be compensated for in software or hardware. Errors due to mispositioning, temperature-related expansion, straightness errors in the transport system, misalignment of sensors and distortion of light sources and lenses are all examples of systematic errors. Random errors are ones that are not repeatable such as sensor noise and mechanical hysteresis. Random errors can be reduced, but not eliminated, by spatial or temporal averaging. In addition to errors that affect repeatability, there are errors that affect accuracy. The measured dimensions must match the same dimensions measured by other means and must be traceable to international standards.

a. Mispositioning Errors

One of the largest errors in measuring dimensions is mispositioning. Although the mounting mechanism of plate 6 locates object 4 with reasonable accuracy, it is not exact. The exact amount of positional error can be determined by making small adjustments to the position of the simulated object 4 to which the measured data is compared.

In mechanical design, objects 4 which are prismatic are often dimensioned relative to orthogonal reference planes; these reference planes are usually the planar surfaces of the object 4. On objects 4 with rotational symmetry, reference planes are often associated with the axis of rotation with cylindrical surfaces of a rotationally symmetric object 4 defining this axis. In either of these cases, the mispositioning of the object 4 can be found by determining the mispositioning of the surfaces that are used to define its reference planes.

One way to determine the mispositioning is to use equations 5 and 6. During the setup of the part, equation 5 is used to find the minimum pseudo-inverse $S^{LM}$ by taking small changes in the simulated reference surfaces for each of the components of the multi-dimensional parameter vector p. The p vector is composed of the three translational components and the three rotational components needed to define the location of object 4 in three-dimensional space. Here, the reference surfaces are treated as a single composite surface made by combining all of the surfel points 21 of the reference surfaces. Next, equation 6 determines the amount of mispositioning of each parameter using the minimum pseudo-inverse found in equation 5; the unit normal vector n is the normal of the reference surface associated with the particular surfel 21. Essentially the method finds which six parameter values cause the simulated surfel points 21 of the reference surfaces to most closely fit the actual surfel points 21. Although hundreds of surfel points 21 may be used in the $S^{LM}$ matrix, the matrix is inverted as part of the setup software when lengthy calculations are possible. During run, calculation time is short because Eqn. 6 is a matrix multiply algorithm consisting of only 6N multiply calculations.

While the matrix techniques of equations 5 and 6 are useful for small mispositioning errors, an alternative technique is valuable for both large and small errors. Equation 7 finds the "residue" of the least squares fit between the measured reference plane points and the simulated reference plane points. The summed error E is a scalar quantity:

$$E = \sum_{1}^{N} \sqrt{(x-x_s)^2 + (y-y_s)^2 + (z-z_s)^2} \ [u \cdot n]$$

where:

x, y, z are the measured coordinates of a reference surface point $x_s$, $y_s$, $z_s$ are the simulated reference surface point coordinates as specified by the geometric model file u is the unit vector (mm) between the measured and the simulated coordinates.

n is the unit vector directed normal to the associated reference plane, and

E is the summed error between the two sets of data.

A composite error $E_{obj}$ for the entire object 4 can be found by summing the error of each individual reference plane surface and multiplying by a weighting function:

$$E_{obj} = \sqrt{\sum_{1}^{K} (w_k E_k)^2} \quad (9)$$

where:

$E_k$ is the summed error E of a reference surface primitive k of object 4

$w_k$ is the weighting of that reference surface primitive $E_{obj}$ is the composite error for the entire object The data from the various surfaces may come from the same sensor as in sensor 51a in FIG. 6A or from different sensors as in sensors 41a . . . 41f in FIG. 5. Indeed xyz location data of the same surface can come from two or more sensors during a single pass of the object. For example, the top surface of object 64 will have xyz data from sensors 61a, 61b and 61c.

Normally, the weighting function $w_k$ is set at unity. However, if a particular surface has a low resolution, its weight can be reduced relative to other high-resolution reference surfaces. In addition, if a particular sensor produces a low resolution, say, due to a large angle between sensor axis and surface normal n, the weighting can be reduced to emphasize higher resolution surfaces from other sensors. Optimal weighting techniques weight each xyz point according to its expected resolution.

The composite error $E_{obj}$ always has a positive value since it is the summation of squared terms. When it is a minimum, the measured data has the closest fit to the simulated object 4. Using a hill-climbing or other similar optimization algorithm, the composite error $E_{obj}$ is minimized by adjusting the parameter vector p of object 4. Since $E_{obj}$ is linear for small changes in the parameter values, optimization algorithms converge quickly. For larger changes, the function is usually monotonic even for relatively large translational and angular displacements.

b. Rotational Mispositioning Errors

Mispositioning errors can also include the rotational mispositioning of rotationally asymmetric objects 8. For example, the flanged bolt 101 shown in FIG. 9 has hex head 102 whose rotational position is random with 6-fold symmetry as the bolt is moved along belt feeder 103 having fixed transparent guide 104 which keeps bolt 101 translationally located. First, using a least squares fit (equation 7) of the xyz data of bolt shank 105 to the geometric model of the bolt shank will determine the direction and location of the bolt's centerline axis 106. Next, the geometric model of "flanged head" 107 of bolt 101 is rotated about axis 106 and the error between the two (using Eqn. 8 where $E_{obj}$ is for only flanged head 107) calculated for each rotation angle 108.

The error function $E_{obj}$ will have six maximums and six minimums as rotation angle 108 rotates through 360 degrees—one for each of the six faces of the bolt's hex head 102. Any of several search methods (e.g., Newton-Raphson, binary) can find the minimum $E_{obj}$. It will be a minimum when the flanged head's actual xyz values and its simulated $x_s, y_s, z_s$ values are closest to each other: when measured bolt 101 most closely fits the simulated bolt.

For objects 8 that are highly asymmetric, pattern recognition can be combined with minimizing the summed error function. Instead of using a single simulation model that is rotated and compared, a set of simulation models for, say, each 30 degrees of rotation are compared. Each simulation model need not compare all the measured data points 21, but only a small subset of data points 21, is required to quickly identify which rotation angle best matches the measured data; 10 points per surface rather than 100 points per surface, for example. Having found the simulation model with the closest rotation angle, the exact rotation angle is found by minimizing the error function $E_{obj}$. Using the complete data set gives the most accurate match.

Figure 9:
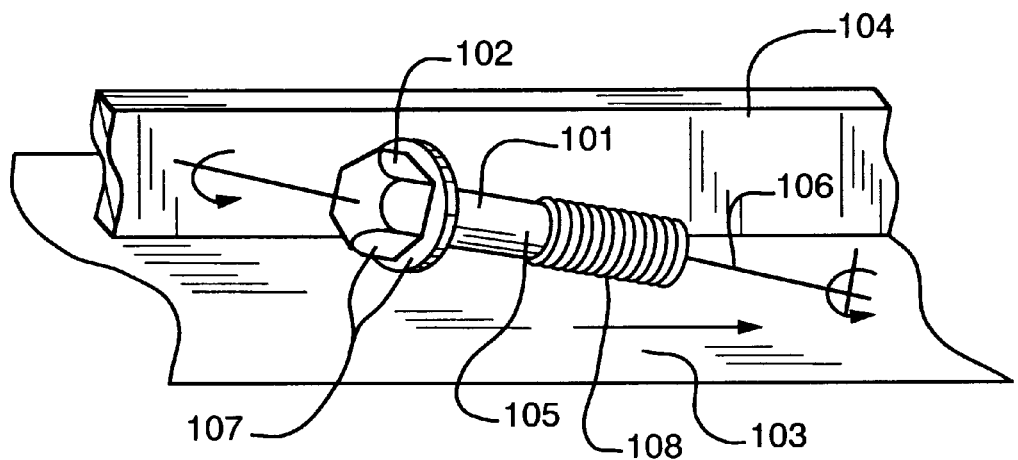
FIG. 9 is an isometric view of a bolt with rotational asymmetries being inspected on a part transport system.

In some cases, the object can be subdivided into two or more composite sub-objects, each of which may have unknown orientations. In FIG. 9, bolt 101 can be divided into separate sub-objects: the bolt's thread 108 and the bolt's flanged head 107. In the manufacture of most flanged bolts, the thread is rolled onto the bolt without orienting the bolt's head; i.e. the orientation between thread helix and head faces is random. As in the example above, the bolt's axis 106 can first be identified by a least squares fit to the bolt's shank 105. Next, head sub-object 107 can be least squares fit to the measured bolt head data by using the head error variable $E_{head}$ and rotating the head about bolt axis 106. Last, thread sub-object 108 can be least squares fit to the measured bolt thread data by using the error variable $E_{thread}$ and rotating the thread about bolt axis 106 to obtain the lowest $E_{thread}$, the best match between simulated and measured thread data. Once the rotation angle of head 107 and thread sub-objects 108 are found, they can be analyzed more accurately. Applying the matrix algorithm of equations 5 and 6 to the resulting geometric model simulation produces a much more accurate measurement of bolt dimensions such as head width and thread pitch.

In general, an object 8 with unknown orientation can be measured in much the same way. If the objects 8 on belt 72 of FIG. 7 are not oriented rotationally, their rotation angle can be found by the iterative technique used above. First a gross measure of the object's rotation angle is found by comparing the measured data to an abbreviated set of simulation models and finding the closest match. These simulation sets need not be computed in real time: they can be simulated ahead of time and stored in memory for quick comparisons. Next the rotation angle is found to higher resolution by either the matrix technique of Eqn. 5 and 6 or by finding the minimum value of the $E_{obj}$ function as the object's simulation is rotated through rotation angles close to those found in the previous gross step.

c. Surface Flaw Errors

While dimensional errors are the most common in manufactured objects 8, other errors result in deformed surfaces. Unlike dimensional errors where the location of the associated surfaces can be found ahead of time, the location of surface flaw errors are not known a priori. Such errors often are the result of handling errors by automation equipment: missed transfers in a multi-blow cold-header, misfed strip in a stamping press, misfed subassemblies in an assembly machine or parts deforming each other in bulk storage. The errors are usually random events (the part processed before and the part processed next are correct) that are at random locations (the flaws could be anywhere on the object 8).

Figure 10:
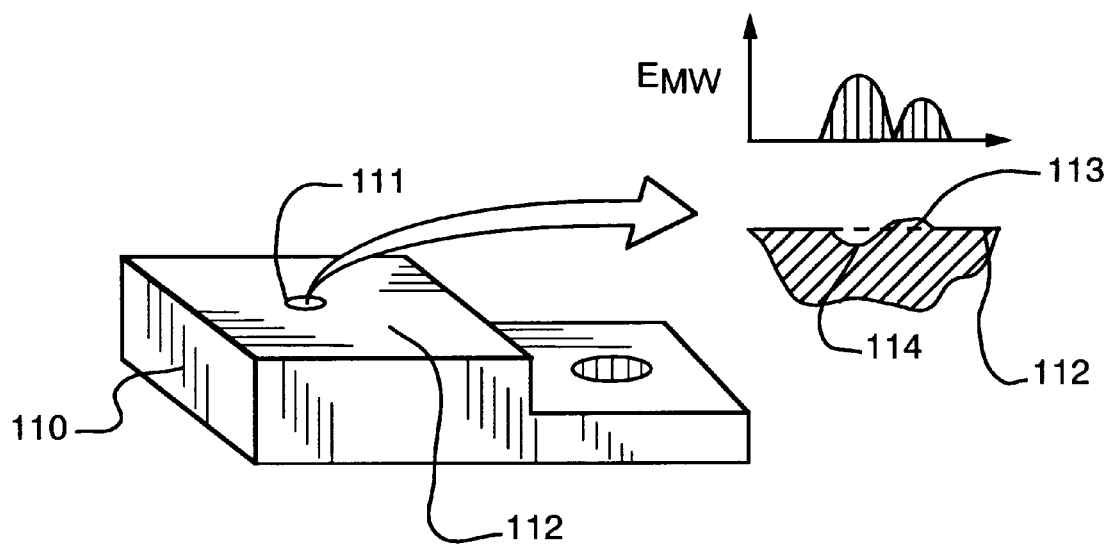
FIG. 10 is an isometric view of an object being inspected with a diagrammatic representation of the object's surface errors.

FIG. 10 shows object 110 with surface flaw 111 in surface 112. The surface flaw projects both above 113 and below 114 surface 112 as shown in the inset on FIG. 10 since many surface flaws simply displace material, not remove it. Once object 110 (or its sub-objects) have been best fit to the sensor data, the residual summed error E or $E_{obj}$ (Eqn. 7, 8) is an indication of the closeness of fit between the simulated data and the actual location of xyz points on its surfaces. When the summed error is high it is an indication that even when the object 8 is fit in the best way possible to the measured data, an error still exists. The summed error $E_{min}$ under best-fit conditions represents a normalized "volume defect" of the part: the difference in volume between the simulated object and the measured data.

The volume defect $E_{min}$ differs from a true volume in two ways. First, it has dimensions of length, not length cubed as volume measures have. Second, the volume defect $E_{min}$ is always a positive number (it is made up of the sum of squared terms) so negative volume defects 114 can't cancel out positive volume defects 113. As shown on the graph of $E_{min}$ in FIG. 10, both positive volume defect 113 and negative volume defect 114 have positive values of $E_{min}$. Surface flaws are those regions of object 110 in which the volume defect is very high. If a part has a gouge in it, the valley portion of the gouge (those portions 114 below the nominal surface) has a high local volume defect as does the surrounding hill portion (those portions 113 above the nominal surface). These regions combine to give a region of high volume defect as large or larger than the gouge itself. Surface flaws are found by searching for regions of volume defect values greater than the normal measurement error of each point. Note that the data point 20 spacing is approximately the minimum dimension of the smallest detectable flaw in order to have at least one point lie within the flaw.

d. Temperature Compensation Errors

A major source of error in any high accuracy inspection system is temperature. Many mechanical probe (CMM) inspection systems must be housed in special temperature controlled rooms to prevent errors due to temperature changes. Temperature compensation can be divided into two parts. The expansion or contraction due to object 4 itself and expansion or contraction due to the inspection equipment.

The first component can be compensated by measuring the environmental temperature and adjusting the simulated size of object 4 (FIG. 1) based on the measured temperature and the coefficient of expansion of its material. After adjusting for size, every dimension on the simulation of object 4 will have expanded or contracted by a percentage of its linear dimension times the temperature difference between it and the reference temperature. The new simulated coordinate values $x_s$, $y_s$, $z_s$ (Eqn. 3) determine the shape of the reference object 4 against which objects 4 are compared. Any changes in the reference object must be matched by a similar change in objects 4 being inspected for their dimensions to be within tolerance.

In addition to expansion of object 4 with temperature, the measuring equipment itself can expand with temperature. Sensors 41 (FIG. 5), 51 (FIG. 6A) or 61 (FIG. 6B) of an inspection machine are held in place by rigid brackets typically fabricated from steel or ceramic. As the ambient temperature changes, these brackets expand or contract in proportion to their linear dimensions and coefficient of expansion in much the same way as the part discussed above. The changes in location of these sensors can be calculated by geometric model simulation of the brackets and the new locations incorporated into the calculations which determine the simulated coordinate values $x_s$, $y_s$, $z_s$ (equation 3). Hence, the expansion or contraction of the equipment itself can be compensated by simulation.

In the method above, the temperature must be measured accurately for compensation to be accurate. Another method is to use the machine itself as the means of temperature sensing. During the setup phase of the machine, the locations of various reference surfaces that are part of the featuring for object 4 are measured using the appropriate sensors 41, 51 or 61. These reference surfaces can either move with object 4 or not, but they must be illuminated by a light source 3 and imaged, at least in part, by a camera 2. For example, surface 9 (FIG. 1) could be a reference surface for the Z direction using light source 3 and camera 2.

If the ambient temperature changes, the location of the reference surfaces change due to expansion and contraction of the bracketry supporting the sensors used. By monitoring the changes in the locations of the reference surfaces, the ambient temperature can be calculated knowing the geometry of the bracketry and the coefficient of expansion of the bracketry. Since the linear dimensions of the bracketry are generally much larger than the linear dimensions of object 4, the expansion of the bracketry is always much greater than the expansion of the object 4, giving accurate estimates of the temperature based on location changes of the reference surfaces. Moreover, the reference surfaces such as surface 9 (FIG. 1) can be references for dimensional inspection of object 4 dimensions. Consider FIG. 1 as an example where various objects 4 are clamped to surface 9 for inspection. Surface 9, as part of the fixturing for object 4, never changes from inspection to inspection. Suppose surface 9 (FIG. 1) moves further from camera 2 due to temperature expansion of the bracketry holding camera 2. Then laser line 7a on surface 9 is displaced in the −X direction from its normal location. By measuring many surfel locations on surface 9 and spatially averaging them, the displacement of surface 9 in the Z direction can be accurately calculated. Since surface 8 is displaced in Z by the same amount due to temperature expansion effects of the bracketry, its location can be compensated by subtracting the location change in the Z direction found in surface 9. Essentially the locations of object 4 surfaces become relative measurements, relative to surface 9, rather than absolute measurements.

Another method of temperature compensation uses the sensitivity matrix of equation 4 where one of the parameters in the parameter vector p (Eqn. 6) is temperature. To find the sensitivity S of the temperature parameter, a small change in the ambient temperature is made from its nominal value and the resulting change in displacement Δd is measured. Temperature changes vary slowly in machinery since it has a high heat capacity (large mass) and low heat transfer characteristics (free air convection from a relatively small surface area); time constants are typically measured in hours. However, machinery in factories is exposed to relatively large temperature swings overnight. If the temperature of the machinery is monitored during this period (to assure it is the machinery temperature and not ambient temperature which may vary at a different rate), the sensitivity of temperature to the displacement of reference surfaces (such as surface 9, FIG. 1) can be accurately found. Including the temperature as part of the parameter vector p assures that the best fit of data points to the measured surfaces of object 4 compensates for temperature as well as for other errors.

e. Component Error

A source of error in an inspection system such as system 40 (FIG. 5) is the component error of sensors 41 themselves. In the preferred embodiment, sensors 41 are modular components that are composed of cameras and laser light sources. Such components have errors that can produce measuring errors in the system as a whole. In the discussion below, each sensor 41 is presumed to be composed of a camera (such as camera 2, FIG. 1) and a laser line source (such as source 3, FIG. 1), combined into a housing such as that shown in FIG. 5. Other types of sensors will necessarily use variations of the methods discussed below which take into account the differences in the sensors. The general approach regardless of the sensor used is to first verify that the sensors are accurate, then use accurate sensors to calibrate other system variables.

The camera of a sensor 41 can have errors in its lenses, errors in its light gathering pixels and errors in its fixturing within sensor 41. The laser light source can have errors in its lenses, errors in the uniformity of its laser line and also errors in its fixturing into sensor 41. The transport system has errors in reporting the exact location in six variables of part holding carriage 46 (FIG. 5). The camera, laser and transport system are tested individually in factory fixtures to assess lens, pixel and position errors.

Cameras are tested in their sensor mounting with a precision fixture such that the camera images a diffusely reflecting surface. A laser spot or line is moved to a precise location on the surface where each camera pixel is individually imaged, one after the other. The camera error is the relationship between the actual pixel locations and the ideal pixel locations. Lens and pixel errors that are identified are kept in a camera error LUT (look up table). During operation of inspection system 40, the camera error LUT will calibrate out camera errors as discussed later.

Lasers are also tested in their sensor mounting on the same precision fixture as above that shines the laser light line onto the diffusely reflecting surface described above. A precision camera determines the width and orientation of the laser line across its length. Any deviations from an ideal laser line are kept in a laser error LUT identified with that particular laser.

A third component of the system 40 is the transport system that moves an object 44 through the inspection region. The transport system has variations which cause the object 44 to vary in its ideal location: the transport rail is not straight, it rotates object 44 about its roll axis and its linear encoder has errors in reporting the position of moving carriage 46 accurately. These errors are detected by a precision measuring system that detects errors in straightness, roll and encoder position at each lengthwise position of the carriage. The results are stored in the transport error LUT identified with that particular transport system.

f. Component Positioning Error

Another source of error for the present invention is due to components such as camera, laser and transport system being mispositioned relative to the geometric model of the inspection system. When the sensors 41, together with the transport system which moves carriage 46, are installed into the system 40, the sensors are unlikely to be located to the accuracy required by their fixturing. For an inspection machine based on simulation to be accurate, its geometric model must accurately match its physical model. Moreover, it must have its accuracy traceable to standards organizations such as NIST in the U.S. Dept. of Commerce.

Measurement of component positioning errors relies on a standard or reference object 44 (FIG. 5) having dimensions traceable to a standards organization. When object 44 is such a standard, it is positioned on clamps 43 and its carriage 46 is moved by its transport system such that all surfaces are exposed to sensors 41. Measurements made by sensors 41 represent the actual surface data of traceable standard 44. The actual values are first corrected for position, lens and pixel errors that have already been determined by the camera, laser and transport system error LUTs. Adjusting for these errors still produces errors due to mislocation of the components as a system 40. For example, while errors of the camera and laser relative to its sensor fixture 41 can be eliminated by incorporation of its associated error LUTs, the sensors 41 are likely misaligned with respect to the carriage 46 by errors in bracketry.

Once the traceable standard has been measured and the errors of individual sensors and the transport system have been compensated, misalignment and mispositioning of each sensor can be compensated by measuring the surfaces of a traceable standard. Any particular sensor 41 can have errors in six parameters: three of angular misalignment and three of translational mispositioning. These six parameters form a parameter vector p. The 3-space location of each surface or edge of the standard object measured by that sensor 41 is an element in a displacement vector d.

Consequently, a sensitivity matrix S can be formed according to equation 4 where each element in the sensitivity matrix is the ratio of the change in displacement vector d to the parameter vector p. As noted earlier, the values of each element in the matrix S is found by making small changes in each parameter in the geometric model and determining the resulting effect on each element of the parameter vector p. The minimum pseudo-inverse matrix $S^{LM}$ can be calculated according to Eqn. 5. The parameter vector is then calculated according to Eqn. 6 where the error vector e is the measured error between the expected value of the reference surface according to the geometric model and the actual coordinates of surfel points 21 (FIG. 3). The result of this calculation is $\Delta p$, the change in the nominal value of the parameter vector, the errors in alignment and position of sensor 41.

The technique used to find the misalignment and mispositioning of a surface primitive (Eqn. 4, 5 and 6) is used here to find the misalignment of a sensor 41. However, the parameter vector p is associated with parameters of the component rather than parameters of the surface primitive. By using this procedure on a multi-sensor system such as shown in FIG. 5, each sensor's actual alignment and position can be found and incorporated into a geometric model of the system which includes these new parameters. More important, the relative parameter errors between two sensors 41 can be accurately determined. In the procedure above, errors in components and assembly of inspecting system 40 are systematically matched with those of the geometric model. Error tables (LUTs) are used that adjust the actual measurements to the geometric model or parameters are determined that adjust the geometric model to the actual measurements. The result is an accurate prediction by the geometric model of surface and edge locations of objects 44 that are subsequently inspected by system 40.

6. Geometric Model Building

In system 40 (FIG. 5) and other like inspection systems shown here, measured data from sensors 41 is compared to the geometric model of object 44. In some cases, the geometric model will exist in a standard geometric model format (such as the IGES format) after being designed in a CAD (Computer Aided Design) software package. However in many other cases, no geometric model exists. The usage of system 40 would be increased by the addition of a method for quickly and easily determining the geometric model by the operator of system 40.

Since system 40, and like systems, already incorporates cameras and lasers within sensors 41, and methods of transporting object 44 past sensors 41, system 40 already has all the components of a "laser scanning system". A laser scanning system uses a similar triangulation method to find the xyz points of an object for first article inspection and reverse engineering. Setup software of system 40 can be used to first scan the image of object 44 when the part is first setup. Object 44 being scanned is clamped by clamps 43 onto moving plate 46 to convey object 44 past sensors 41. Since the setup software can take much more time than the inspection phase, scanning can be done very slowly and many more xyz points can be determined than during the inspection phase. While inspection time is in seconds or even fractions of a second, the setup phase, performed once for each part number, could take minutes rather than seconds.

In some cases an object 44 can have a large variation from part to part: each object 44 will have different dimensions. Examples are sandcast parts, processed food products (candy, cookies) and harvested food products (nuts, fruit). In these cases, many objects 44 can be scanned, with the scanned points from each object 44 averaged to form a composite object 44. The averaging method is also suitable for objects 44 which are imprecisely located or which have various amounts of asymmetry. It should be noted that though a single object 44 has been presented, that the concept would apply equally to an averaged object 44.

The method of the present invention for determining the geometric model, described below, is much simpler than determining a complete CAD-based geometric model. In a CAD-based geometric model, every surface of the part must be included for a complete description. In addition, small features such as fillets and rounds must also be identified. By contrast, the CAI-based (Computer Aided Inspection) geometric model need only include surfaces that are associated with needed dimensions. In some inspection tasks, only the major surfaces of the part are required. In others, only a few important locating pins are required (the pin 123d in FIG. 11, for example). In addition, dimensions associated with most surfaces often have unreliable data close to the surface edges. Edge information is avoided in a CAI-based geometric model for the most accurate measurements. Hence the geometric model is a simplified subset of the complete CAD model that is also quicker and easier to develop.

a. Constructing Surfaces

The procedure described below has been implemented on a Pentium computer running under the Microsoft Windows operating system that controls a single axis inspection system similar to that in FIG. 1. It is but one way of determining a simplified CAI-based model. Clearly there are many other variations of the procedure described. However, this procedure was chosen because, on tests with unskilled operators, it was the simplest to program and use.

Figure 12A:
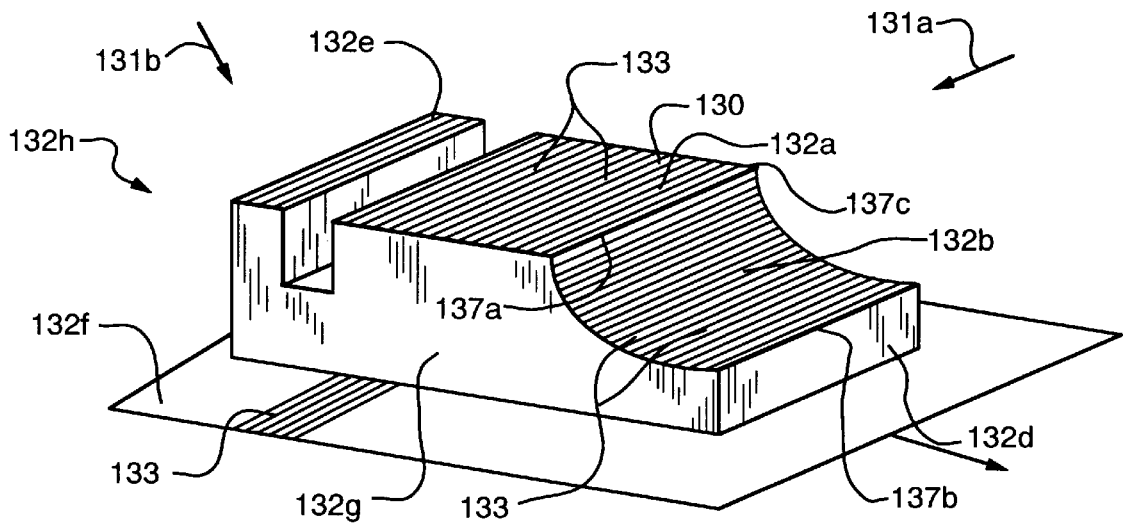
FIG. 12A is a simplified isometric view of an object being inspected showing scan lines on the object's surfaces.
Figure 12B:
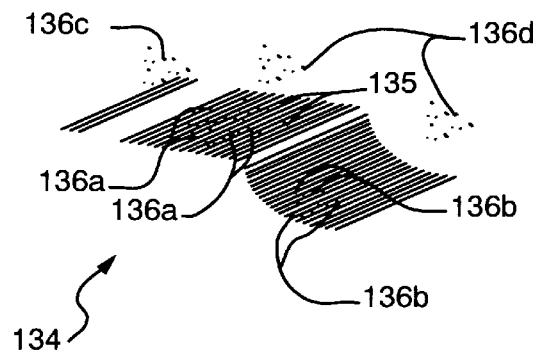
FIG. 12B is the graphic representation of the object in FIG. 12A rendered on a computer monitor showing extraneous data points.

FIG. 12a shows surfaces 132 of object 130 moving on a transport system (not shown) beneath sensors 131. As object 130 slowly moves past sensors 131, xyz values are calculated for surfaces 132. Scan lines 133 of the laser light line for sensor 131a are indicated on surfaces 132a and 132b, with different scan lines resulting at different positions of object 130 (or frames of the camera of sensor 131) as it passes beneath sensor 131a. As shown in FIG. 12b, these xyz values 136a and 136b are shown on computer monitor 134 as an isometric view which has some resemblance to object 130. However there are also many extraneous xyz values 136c and 136d that result from multiple reflections from fixtures and from the object 130. The perspective of the isometric view can be rotated or magnified by the operator to get the best vantage of important surfaces.

Figure 12C:
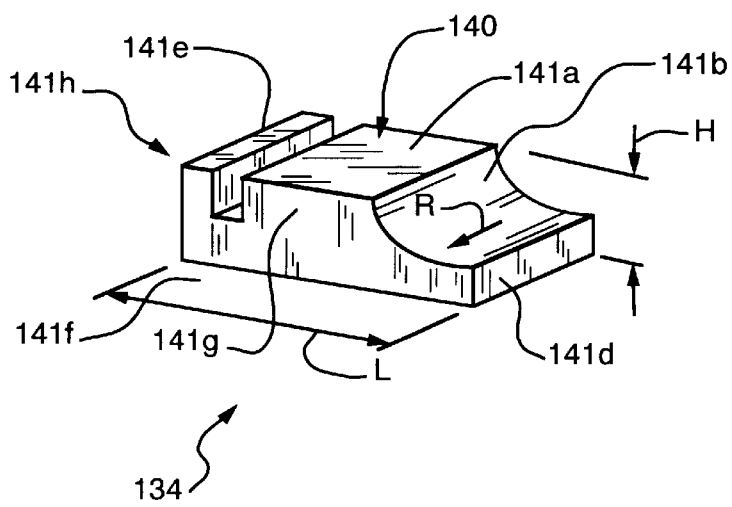
FIG. 12C is the graphic rendering as shown FIG. 12B with the surfaces reduced to simplified geometric model surfaces.

In building the CAI-based geometric model 140 of FIG. 12c, the operator first identifies which of several primitive surfaces that he wishes to construct in the geometric model. For example, knowing that surface 132a is a plane, he chooses the "plane tool" from his CAI toolbox on the edge of his monitor, specifying that it is a plane he wishes to construct. Note that a similar procedure is used to construct other primitive surfaces such as a cylinder, cone, sphere or torus. He then moves his mouse cursor over the isometric image of data points 136a on monitor 134. To identify a surface 132, the operator must identify several xyz points that belong to that surface. In the case of plane surface 132a, he positions his cursor over the five points 135 located on the monitor image 134 of surface 132a. The cursor represents the end view of an imaginary line that is perpendicular to monitor screen 134. When the mouse button is clicked, the xyz point which is closest to this line is chosen as one of the set of points that will identify the plane surface 132a. Each point chosen should be toward the edges of the surface and far from other chosen points in the set to best identify surface parameters.

Clicking on the right mouse button directs the software to construct a planar surface using a least squares fit of the chosen points to a plane. While as few as three points are needed to identify a plane, choosing more points (five in this example), gives a more accurate representation of the plane's location. The least squares fit procedure is the same as that discussed earlier in regard to "Shape Primitives of Surfaces". Here the elements of a parameter vector p are found which have the least error between the chosen xyz points and the shape primitive.

Once the coarse location of the surface such as plane 132a is identified by the above procedure, two other surfaces, called the tolerance surfaces, are constructed parallel to this surface, each a small perpendicular distance on either side of the coarse surface. In the case of a planar primitive, the tolerance surfaces are two parallel planes. For a cylindrical primitive, the tolerance surfaces are two cylinders on either side of the coarse cylinder. All xyz points that fall between the two tolerance surfaces are associated with the surface under construction. These points change to a specific color to identify them as belonging to that surface.

b. Finding Parameters, Thickness and Extent

The chosen points may be edited in several ways. First, the points chosen can be "refit" to the surface. A subset of the points (typically a fixed percentage of the points chosen) further refine the parameters p of the defined surface, such as plane 132a in FIG. 12, by least squares fitting this subset of points to the surface primitive. The "refit" tool can be used at any time to include only the latest points desired as those which define its surface parameters p.

Another type of editing is adjusting the "thickness" of the surface. Since some xyz points may be multiple reflections or other spurious values, the spacing between tolerance surfaces should be as small as possible to exclude all but those points closest to the defined surface primitive. One method is to simply define the tolerance distance as the same value as the dimensional tolerance of that surface. For example, if the height of plane 132a above plane 132f has tolerances of +/−25 microns, then the spacing between the tolerance planes would be set at +/−25 microns.

Another method is to initially set the tolerance much larger than the expected tolerance (five times larger, for example) and find the best surface primitive parameters p based on this set. Then the perpendicular distance of each xyz value in the set is measured relative to the surface defined by the parameters p to determine the standard deviation of these distances. In the case where the object 130 represents an average of many scanned objects 130 rather than a single scanned object 130, the set of xyz points include points from all the scanned objects 130. Next, all but the closest xyz points are excluded, i.e. any whose distance from the surface exceeds a predetermined threshold (2 sigma of the points found, for example). These new points are then used to find new surface parameters p'. The procedure can be invoked iteratively using the values of p' in place of p to further refine the location of the surface.

Once the parameters (location, alignment and size) and thickness of a surface primitive are found from the scanned data, its extent can be determined. For example, a plane defined only by its parameter set p locates a plane of infinite extent. However, a real object 130 (FIG. 12) has surfaces that are limited, not infinite. Since the extents of a surface are often defined by other surfaces, the intersection of surfaces can define what portion of the primitive belongs to model 140 and which does not. Most surfaces, such as surface 132a, are limited by intersections with other surfaces. Edge 137a is the intersection of plane surface 132a and cylindrical surface 132b. Similarly, edge 137b forms the intersection between plane surfaces 137a and 132g limiting the extent of plane 132a.

Surfaces 141 (FIG. 12C) show the primitive surfaces 132 as they have been limited in extent by intersections 137 with other surfaces 132. These surfaces 141 are the beginning of geometric model 140 of object 130. Once the extents of a surface are defined, the object ceases to be a collection of scanned points 136 but becomes instead a geometric model 140 of its surface. It is surfaces 141 from which dimensions of object 130 are taken during dimensional inspection.

An alternative method of defining the extent of a surface is to use that portion of the surface that has scanned points 136. However, since the surfaces of real objects 130 often have rounds and fillets that blend one surface into another, the surfaces defined by scanned points 136 represent only the central portion of an actual surface. Yet from a dimensioning viewpoint, most rounds and fillets are superfluous to the part's dimensions. The rounds and fillets could be added to the geometric model (after all, a round or fillet is simply a cylindrical surface of small radius), but in most cases they complicate the model. Moreover, definitions of extent that use the intersections of surfaces are defined parametrically, making them much more exact than definitions based on scanned points. A disadvantage of the intersection method is that surfaces can require scanned points from several aligned sensors to accurately define intersections 137 that limit the extent of a surface.

If the geometric model is to be used for reverse engineering or for developing a CAD-based model of an existing part, then the intersection method is preferred because of its exactness. If the geometric model is to be used only for inspection purposes, i.e. a CAI-based model, the extents of the surface are not required. Inspecting an object 130 requires only that windows 17 (FIG. 2A) or 30 (FIG. 4A) be defined. Since these windows are composed of scanned points 136, a subset of the scanned points 136 is all that is needed. Dimensions for inspection purposes are defined by the location of surfaces 132 which become surfaces 141 (FIG. 12c), part of the geometric model, once they have been so identified. Surfaces 132, which are to be become surfaces 141 of the model, have extents defined by scanned points 136 which are part of the surface primitive—and which are unaffected by rounds and fillets in any case.

If the model is to be used only for inspection purposes, the extents of a surface 132 can be defined is through its edges. Edges show on the scanned image 134 as the locus of endpoints on scanned lines 133 of xyz points. As noted previously (see Surface Measurements), edges are not as accurate as surface intersections. However, they are perfectly suitable for a CAI-based model 140 that is used for inspection. They may not identify the maximum size of surface 132 as required by a CAD-based model, but they show the maximum extent of its scanned points 136 from which surface dimensions can be extracted.

c. Partitioning or Ungrouping Surfaces

Once surfaces have been defined in terms of parameters, thickness and extent, they can be grouped (i.e., joined) or ungrouped (i.e., partitioned). The nature of the surface defining method above produces surfaces that are defined by the same surface primitive and are therefore grouped together. For example, on object 130 both surfaces 132a and 132e belong to the same plane primitive. When points 135 are chosen based on surface 132a, surface 132e is also chosen. In geometric models, surface 132a might or might not be considered the same as surface 132e, depending on which dimensions were required.

One method for partitioning a surface works like the popular "paint" software with only surfaces that are contiguous counted as belonging to the same surface primitive. By clicking on a "paint tool", the operator can click his cursor on a surface to be partitioned. The software picks the nearest scan point 136 and then checks each nearest neighbor scan point 136 to see if it belongs to the same surface 132. Then it checks the neighbors of those points 136 and so forth until all portions of the surface which are nearest-neighbor connected to the initial point are identified. If the initial point were on surface 132a, only points 136 on that surface would be identified. Similarly, points 136 on surface 132e that do not contact surface 132a would not identified as part of that surface. This method is useful when many surfaces all belong to the same plane such as the contacts of an electronic connector.

Another method of partitioning first identifies which is the subject surface to be partitioned. The operator uses the mouse cursor as a pen to draw a line that encircles that portion of the surface to be classified on the geometric model as a separate surface. Clicking on a partition tool assigns the two portions of the initial surface as two separate surfaces in the geometric model 140. This same method can be used to eliminate scan points 136 which do not belong to any dimensioned surface 132 or which are spurious points such as points 136d that are an artifact due to multiple reflections of light from sensors 131. Instead of assigning the encircled surface as a particular surface 141 of the geometric model, those points 136 are simply eliminated. After all surfaces 141 of interest have been identified from the scan points 136, unassigned points 136 are also eliminated to make a cleaner picture of object 130 like that shown in FIG. 12C.

d. Joining or Grouping Surfaces

In addition to partitioning surfaces, surfaces can also be grouped or joined. Grouping is often required when a portion of an object 130 or its fixturing (bracketry 43 of FIG. 5, for example) occludes scan points 136 from a surface 132, making a single contiguous surface appear as two separate surfaces. To group two surfaces together for inspection purposes requires that scan points 136 of each group member be combined together into one surface. The new grouped surface 132 can be readjusted for thickness and extents using the combined set of scan points 136 in defining a grouped surface 141 for model 140.

Grouping is especially important for multi-sensor inspection where several sensors 131 can produce scan points 136 for the same surface 132. In this case, the scan point 136 of each surface 132 can't simply be combined as above. The surfaces 132 identified by each sensor 132 may not have the same parameter vector p as the sensors 131 may not be accurately aligned, the same thickness as the resolution of each scan point may differ, or the same extents as surfaces may be occluded differently as viewed by each sensor 131.

Because dimensions that are based on a surface's extent and thickness variations have only a second order effect on dimensions, it is the parameter vector p which is most important. Errors in p translate directly into errors in dimensions. However when the parameter vector p is used for inspection purposes, each sensor's parameters represent a "nominal" surface 141, about which dimensional variations will be found during inspection of subsequent objects 130 for that sensor 131. Mathematically, the parameter vector for each sensor K (taken from Eqn. 6) is:

$$p_K = p_{0K} + \Delta p_K = p_{0K} + S_K^{LM}(e_K \cdot n_K) \quad (10)$$

The dimensions $p_K$ are composed of the nominal position of the surface primitive $P_{0K}$ and the variation from that nominal value $\Delta p_K$. Although the values of $p_{0K}$ may differ between sensors 131 viewing the same surface 132, the variation in $\Delta p_K$ is the same for all sensors 131: it is based on the sensitivity matrix S which (except for higher order effects) is the same for all sensors 131. While the parameter vector may not match between sensors 131, the changes in dimensions that they predict match very closely.

Each sensor 131 may not have the same number of scan points 136 from which to choose xyz points to determine the positions of surfaces 141. Portions of a surface 132 may be occluded to one sensor 131 and not to another or the angle of a sensor 131 to the surface normal may produce xyz points with poor resolution. The simplest way to combine the results from several sensors 131 is to average the results from each sensor 131 to get a composite value based on several perspectives which gives higher resolution than from a single sensor 131. Methods that are more elaborate take into account the resolution of each scanned point 136 based on the geometry of the sensor and surface relationship or on the spatial repeatability when several objects 130 are averaged. These methods use a weighted average: higher resolution or higher repeatability points 136 are weighted more than those with lower resolution or lower repeatability.

e. Adjusting Surfaces

Once several surfaces 141 have been identified, they can be adjusted. Typical adjustments are for parallelism, perpendicularity and tangency. Adjustments are often based on a reference surface 141 that is held fixed and other surfaces 141 are adjusted relative to it. In FIG. 12c, suppose surface 141f is considered the reference surface having a parameter vector p. Surface 141a could have its parameter vector p adjusted to have the same parameter vector p as surface 141f. Similarly, surface 141g could have its vector p adjusted to be perpendicular to surface 141f and also to surface 141a.

In adjusting a surface's parameter vector, the angular components are adjusted first and, if required, positional components are then adjusted. For example, in a tangency adjustment, cylindrical surface 141b might have its parameter set p adjusted to make its surface at edge 137c (FIG. 12A) tangent to surface 141a. First, the direction cosines (alignment of its axis) are adjusted to be perpendicular to surfaces 141f and 141a, then the position of its axis and diameter is adjusted to bring its lower surface to be parallel with surface 141f.

f. Dimensioning

Having defined and aligned the surfaces 141 identified by scanning, object 130 is dimensioned. In dimensioning, the relative distance or other dimensional attribute (i.e., angle, and perpendicularity) between two surfaces or a component of the parameter vector (i.e., radius of a sphere, diameter of a cylinder) is found. In practice, these dimensions form a quality specification that specifies which dimensions are on the dimension list.

If the dimension is a component of the parameter vector, then the surface 141 and the associated component are added to the dimension list. For instance, in specifying the radius R of surface 141b, a radius tool is chosen from the toolbox of possible operations. The cursor is placed over the graphic portion of surface 141b on monitor view 134. When the operator clicks his mouse input, the diameter component of the parameter vector of surface 141b is divided by two and placed on the dimension list as radius R.

In many cases, two surfaces are needed to define a dimension. The height of object 130 is the linear distance between base plane 141f and top plane 141a. To measure it, the operator chooses the "distance tool" from his toolbox. The distance tool requires two plane surfaces to be selected. The operator first chooses the reference surface 141f by positioning his cursor over the graphic portion of surface 141f and clicks his mouse input. Next, he performs the same operation for the second surface 141a. When both surfaces have been identified, the height dimension H is added to the dimension list.

Depending on the sensor 131 layout, many of the dimensions will likely incorporate several sensors 131. For length L of object 130, sensor 131a measures the location of plane 141d while sensor 131b measures the location of plane 141h on the rear side of object 130. In these cases, the geometric model 140 is rotated so its rear face 141h is visible; it is then selected as one of the two surfaces 141 used to specify the length dimension. In this way, all the required dimensions are specified in turn, completing the setup of scanned object 130. Setup software compiles all the dimensions specified on the dimension list and finds the location of windows 17 (FIG. 2A) or windows 30 (FIG. 4A) for each surface on the list. As discussed above, each surface 141 may require more than one sensor 131 to determine the parameters of each surface. Note that once the parameter vectors of surfaces 141 have been defined, for a CAI-based model 140 their thickness or extent is no longer required as thickness and extent attributes were needed only to refine the parameter vector during setup.

The surfaces 141 are completely defined by their parameter vector $p_K$, which in turn is measured for an unknown object 130 by applying a least-squares fit of xyz values from its windows 17 and 30. The least-squares fit (Eqn. 10) uses the sensitivity matrix S to find the variation $\Delta p_K$ of each surface k from its nominal parameter vector $p_{OK}$. Dimensions of unknown object 130 are found from the sets of parameter vectors $p_K$ for each surface, combined into dimensions according to the specifications of the dimension list.

When an object 130 is scanned to produce CAI-based geometric model 140, compensation is simplified because all measurements are made relative to the scanned surfaces 132 of object 130. In essence, these scanned surfaces 132 become the reference surfaces for further measurement; object 130 becomes the standard or calibration object (FIG. 5).

Instead of elaborate alignment, compensation and calibration, the only requirement is that the initial scanned object 130 be accurately measured since further measurements are based on this object 130. If the camera lens are distorted, the distortion will affect scanned points 136 of unknown objects 130 by the same amount as it affected the initial scanned points 136. If the camera pixel array has flaws, the same flaws will be in the initial scanned object 130 as in subsequent ones. Sensors 131 or components within the sensor may be mispositioned but the effect will be only a higher order one. Equation 10 shows that it is the change in the parameter vector from its nominal (the scanned object 130) that is important, not the nominal vector itself. The scanned object method gives accurate results without the extensive alignment, calibration and compensation of other methods.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for measuring the shape characteristics of a plurality of objects comprising:
   a first object having a plurality of locations on a plurality of surfaces to be inspected;

a structured light source disposed at a first angle to illuminate said first object;

a camera disposed at a second angle from said first angle such that the locations on the surfaces of said first object can be found in three dimensional space, said camera adapted to create an image from light reflected from said first object;

an array of light gathering elements for gathering the imaged light from said camera and converting said imaged light into an electrical signal;

analysis means adapted to determine shape characteristics by dividing the image of the object into a multiplicity of simplified surface primitives and edge primitives and finding a set of three dimensional locations on each contributing primitive; and inspection means by which the same shape characteristics of a plurality of subsequent objects are determined;

wherein, a plurality of objects are inspected by illuminating said first object with said structured light source, creating an image of said first object with said camera, converting the image into an electrical signal with said array of light gathering elements, analyzing the signal with the analysis means, repeating the process for each of said subsequent objects, and comparing results with results from said first object.

2. The system of claim 1 wherein the surface primitives of said analysis means are chosen from a group consisting of planes, cylinders, cones, helixes, Torii and spheres.

3. The system of claim 1 in which the edge primitives of said analysis means are chosen from a group consisting of straight lines, arcs, conic sections and space curves.

4. The system of claim 1 wherein the set of three dimensional locations includes only those three dimensional locations that are in close proximity to a surface primitive.

5. The system of claim 1 wherein the set of three dimensional locations includes only those three dimensional locations that produce similar electrical signals at different times while the object remains stationary.

6. The system of claim 1 wherein the set of three-dimensional locations includes only those three dimensional locations that are surrounded by other three dimensional locations at approximately the same position in three-dimensional.

7. The system of claim 1 wherein said inspection means uses a difference in the electrical signals between said first object and subsequent objects to determine shape characteristic differences between said first object and subsequent objects.

8. The system of claim 1 wherein a repeatability of said inspection means may be improved by increasing a number of three dimensional locations in said set of three dimensional locations.

9. The system of claim 1 wherein a number of locations in the set of three-dimensional locations is pruned to minimize a time required to inspect the object.

10. The system of claim 1 wherein said analysis means determines a location, a shape and an orientation of each surface primitive and each edge primitive based upon the set of three dimensional locations found on said first object; defines a set of parameters that specify an idealized set of primitives; and compares three dimensional locations found on subsequent objects to the idealized set of primitives.

11. The system of claim 10 wherein said analysis means detects flaws in subsequent object by comparing each three dimensional location associated with a primitive of a subsequent object to a corresponding location computed from its idealized primitive to determine the position and size of the flaw.

12. The system of claim 10 wherein said analysis means detects changes in dimensions of a subsequent object with respect to said first object by comparing a parameter set of a primitive of said first object with a parameter set of the corresponding primitive of the subsequent object.

13. The system of claim 10 wherein said analysis means performs a least squares fit of the three dimensional locations associated with each primitive of subsequent objects to the corresponding idealized primitive to determine changes in location, shape and orientation of that primitive with respect to said first object.

14. The system of claim 10 wherein said analysis means adjusts location, shape and orientation of the idealized primitives found from three dimensional locations of said first object based upon information provided during a setup phase by a user of said system.

15. The system of claim 1 wherein said structured light source is a laser light source.

16. The system of claim 15 wherein the laser light source comprises optical mechanisms that focus the light into a laser light plane having a narrow thickness relative to a size of said object, and a scanner for moving the laser light plane relative to the first and subsequent objects to illuminate a narrow portion of said first object and subsequent objects.

17. The system of claim 16 wherein the scanner moves the objects past a stationary laser light plane.

18. The system of claim 16 wherein the scanner directs the laser light plane onto a mirrored surface that rotates about an axis to move the laser light plane over a stationary object.

19. The system of claim 16 wherein an intensity of the laser is controlled as the plane moves over said objects to maintain a substantially constant light intensity imaged by said camera.

20. The system of claim 15 wherein said laser light source comprises optical mechanisms that focus the light into a laser light spot having a size that is small compared to the size of object surfaces, and a scanning mechanism for moving the laser light spot relative to the first and subsequent objects to illuminate a small spot on said first object and subsequent objects.

21. The system of claim 20 wherein the scanning mechanism directs the laser light spot onto two successive mirrored surfaces rotating about an axis in order to move the laser light spot over a stationary object.

22. The system of claim 20 wherein an intensity of the laser producing the light spot is controlled as the spot moves over said objects to maintain a substantially constant light intensity imaged by said camera means.

23. The system of claim 1 further comprising a rotating fixture for positioning said objects such that shape characteristics on two or more sides of said objects may be determined.

24. The system of claim 1 wherein said analysis means and said inspection means use the spatial average of a multiplicity of first objects all positioned at approximately the same location and orientation for finding the set of three dimensional locations on contributing primitives.

25. The system of claim 1 further comprising mirrored surfaces that reflect structured light from said light source onto primitives of the object that are occluded from illumination by a straight path from the light source and in which reflected light from the same primitives are reflected by the mirrored surfaces for imaging onto the array of light gathering elements.

26. The system of claim 1 wherein a multiplicity of cameras image light reflected from different sides of said first object and wherein said analysis means uses a set of three dimensional locations found by the multiplicity of camera means on said first object to determine the shape characteristics of subsequent objects by analyzing the electrical signals of the multiplicity of camera means at the locations found for said first object.

27. The system of claim 1 wherein said analysis means further comprises a set of editing tools, said editing tools allowing a user to identify primitives by editing a graphical representation of said first object.

28. The system of claim 27 wherein said set of editing tools comprises at least one tool selected from a group consisting of tools for identifying primitives by identifying one or more three dimensional locations in the primitive, tools for eliminating three dimensional locations which lie further than a statistically determined distance from a primitive, tools for to determining the extent of a primitive, tools for partitioning primitives into several primitives, tools for joining several primitives into a single primitive, tools for adjusting primitives to position them relative to other primitives and to reference surfaces, and tools for specifying the primitives to be used for the determination of shape characteristics of subsequent objects.

29. The system of claim 1 wherein said analysis means is adapted to allow primitives to be fixed in orientation but repositioned by least squares fit to a position that more closely matches the three dimensional locations found on a subsequent object in order to more accurately determine shape characteristics of that object.

30. A system for measuring shape characteristics of an object comprising:

a first object having a plurality of surfaces having a plurality of shapes to be inspected;

a desired object having a plurality of surfaces and a plurality of surfaces specified by a computer file;

a structured light source disposed at a first angle to illuminate said first object;

a camera disposed at a second angle from said first angle such that the locations on the surfaces of said first object can be found in three dimensional space, said camera adapted to create an image from light reflected from said first object;

an array of light gathering elements for gathering the imaged light from said camera and converting said imaged light into an electrical signal;

simulation means for simulating optical characteristics and electrical characteristics of said structured light source and said camera in three dimensions, dimensions and orientation of a layout of the system, and light reflection characteristics of the desired object to simulate the electrical output of each element of said array of light gathering elements by said desired object when illuminated by said light source;

analysis means adapted for determining shape characteristics by dividing said desired object into a multiplicity of simplified surface and edge primitives and using said simulation means to predict a set of three dimensional locations on each primitive;

inspection means by which the shape characteristics of objects having a similar shape to the shape of the desired object in said computer file are determined by positioning the similar object at approximately the same location and orientation as the simulation of said desired object and analyzing the electrical signals of the camera means at the three dimensional locations found from said analysis means.

31. The system as claimed in claim 30 wherein said simulation means is further adapted to calculate a differential variation of simulated system parameters with respect to actual measurements of three dimensional surface locations of said first object.

32. The system as claimed in claim 30 wherein a set of three-dimensional locations of said first object includes only those three-dimensional locations that are in close proximity to a surface primitive.

33. The system as claimed in claim 30 wherein a set of three-dimensional locations of said first object includes only those three dimensional locations that produce similar electrical signals at different times while the object remains stationary.

34. The system as claimed in claim 30 wherein a set of three-dimensional locations of said first object includes only those three dimensional locations that are surrounded by other three dimensional locations at approximately the same position in three-dimensional space.

35. The system as claimed in claim 30 wherein said inspection means determines differences in shape characterics between said desired object and said first object by comparing the difference between the actual electrical signals from said first object and simulated electrical signals for the desired object.

36. The system as claimed in claim 30 wherein a repeatability of said inspection means may be improved by increasing a number of three-dimensional locations in said set of three-dimensional locations.

37. The system as claimed in claim 30 wherein a number of locations in the set of three-dimensional locations is pruned to minimize a time required to inspect the object.

38. The system as claimed in claim 30 wherein said analysis means detects flaws in subsequent object by comparing each three dimensional location associated with a primitive of a subsequent object to a corresponding location computed from its idealized primitive to determine the position and size of the flaw.

39. The system as claimed in claim 30 wherein said analysis means detects changes in dimensions of a subsequent object with respect to said first object by comparing a parameter set of a primitive of said first object with a parameter set of the corresponding primitive of the desired object.

40. The system as claimed in claim 30 wherein a set of three dimensional locations associated with each primitive of objects having a similar shape to the desired object is least squares fit to a corresponding primitive of said desired object to determine changes in location, shape and orientation of that primitive with respect to said desired object.

41. The system as claimed in claim 30 wherein said structured light source is a laser light source.

42. The system as claimed in claim 30 wherein the laser light source comprises optical mechanisms that focus the light into a laser light plane having a narrow thickness relative to a size of said first object, and a scanner for moving the laser light plane relative to the first objects to illuminate a narrow portion of said first object.

43. The system as claimed in claim 42 wherein said scanner moves said first object past a stationary laser light plane.

44. The system as claimed in claim 42 in which the scanning mechanism directs the laser light plane onto a mirrored surface which rotates about an axis to move the laser light plane over a stationary object similar to the desired object.

45. The system as claimed in claim 44 wherein the scanner directs the laser light spot onto two successive mirrored surfaces, each rotating about an axis, to move the laser light spot over stationary objects similar to said desired object.

46. The system of claim 30 wherein said desired object is positioned on a simulated rotating fixture and said first object is positioned on an actual rotating fixture to allow determination of shape characteristics on two or more sides of the object; and whereby a shape characteristics associated with a primitive which is occluded from view on one side of the object can be determined using three-dimensional locations found on another side of the object.

47. The system as claimed in claim 30 wherein said simulation means further comprises error correction means for the optical and electrical characteristics of said structured light source and said camera means, for the mechanical operation of scanning mechanisms, for the dimensions and orientation of the system layout and for the light reflection characteristics of the desired object based upon actual measurements made by said inspection means on an object having known shape characteristics; whereby the error correction means are such that the simulated shape characteristics of the desired object asymptotically approach the known shape characteristics of the measured object as the error correction means become more refined.

48. The system as claimed in claim 47 wherein error correction means are adapted to perform a sensitivity analysis of a set of system parameters to a set of measured errors between desired object shape characteristics and known object shape characteristics in which the set of parameters is least squares fit to the set of measured errors.

49. The system as claimed in claim 30 wherein a multiplicity of cameras image simulated reflected light from different sides of said desired object and wherein said analysis means uses a set of three dimensional locations found by the multiplicity of cameras on said desired object; wherein said inspection means determines the shape characteristics of similar objects by analyzing the electrical signals of the multiplicity of camera means at the locations found for said desired object.

50. The system of claim 30 wherein said analysis means further comprises a set of editing tools, said editing tools allowing a user to identify primitives by editing a graphical representation of said desired object.

51. The system as claimed in claim 50 wherein said editing tools include ways to identify primitives by identifying one or more three dimensional locations in the primitive, ways to eliminate three dimensional locations which lie further than a statistically determined distance from a primitive, ways to determine the extent of a primitive, ways to partition or ungroup primitives into several primitives, ways to join or group several primitives into a single primitive, ways of adjusting primitives to position or align them with other primitives or with reference surfaces and ways of specifying the primitives to be used for the determination of shape characteristics of similar objects.

52. The system of claim 30 wherein said analysis means is adapted to allow primitives to be fixed in orientation but repositioned by least squares fit to a position that more closely matches the three dimensional locations found on said first object in order to more accurately determine shape characteristics of said first object.

* * * * *